(12) United States Patent
Nagakubo et al.

(10) Patent No.: US 11,743,922 B2
(45) Date of Patent: Aug. 29, 2023

(54) WIRELESS COMMUNICATION DEVICE, COMMUNICATION SYSTEM, WIRELESS COMMUNICATION METHOD, AND COMPUTER PROGRAM PRODUCT

(71) Applicant: KABUSHIKI KAISHA TOSHIBA, Tokyo (JP)

(72) Inventors: Sakie Nagakubo, Kawasaki Kanagawa (JP); Hiroki Kudo, Kawasaki Kanagawa (JP); Yasuyuki Tanaka, Kawasaki Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 85 days.

(21) Appl. No.: 17/458,043

(22) Filed: Aug. 26, 2021

(65) Prior Publication Data
US 2022/0264564 A1    Aug. 18, 2022

(30) Foreign Application Priority Data

Feb. 17, 2021  (JP) ................................ 2021-023099

(51) Int. Cl.
*H04W 72/27*  (2023.01)
*H04W 52/02*  (2009.01)
(Continued)

(52) U.S. Cl.
CPC ....... *H04W 72/27* (2023.01); *H04W 52/0203* (2013.01); *H04W 72/0446* (2013.01); *H04W 40/22* (2013.01)

(58) Field of Classification Search
CPC ........ H04B 7/15; H04W 16/00; H04W 40/04; H04W 40/10; H04W 40/22; H04W 40/24;
(Continued)

(56) References Cited

U.S. PATENT DOCUMENTS

| 11,064,417 | B2* | 7/2021 | Teyeb ................ H04L 43/0858 |
| 2008/0075094 | A1* | 3/2008 | Ahn ...................... H04W 72/23 |
| | | | 370/400 |

(Continued)

FOREIGN PATENT DOCUMENTS

| CN | 108430111 A | * | 8/2018 | ........ H04W 72/0406 |
| JP | 2010278693 A | * | 12/2010 | |

(Continued)

OTHER PUBLICATIONS

Song et al. "TreeMAC: Localized TDMA MAC Protocol for Real-time High-data-rate Sensor Networks", IEEE International Conference on Pervasive Computing and Communications, (Texas, USA, Mar. 2009), pp. 1-10 (Year: 2009).*

(Continued)

*Primary Examiner* — Shah M Rahman
(74) *Attorney, Agent, or Firm* — Finnegan, Henderson, Farabow, Garrett & Dunner, LLP

(57) ABSTRACT

A wireless communication device according to an embodiment is a wireless communication device included in a multi-hop network in which data is relayed in multiple stages in time division communication. A decision unit decides an additional slot, based on identification information received from a child node that transmits data to the wireless communication device. A communication processing unit transmits and receives data using the additional slot and a basic slot assigned based on frame information in the time division communication.

11 Claims, 25 Drawing Sheets

(51) Int. Cl.
*H04W 72/0446* (2023.01)
*H04W 40/22* (2009.01)

(58) Field of Classification Search
CPC ......... H04W 52/0203; H04W 72/0426; H04W 72/0446; H04W 72/27
See application file for complete search history.

(56) References Cited

U.S. PATENT DOCUMENTS

| | | | |
|---|---|---|---|
| 2010/0067476 A1* | 3/2010 | Periyalwar | H04L 41/044 370/329 |
| 2010/0323613 A1* | 12/2010 | Imaeda | H04W 40/22 455/9 |
| 2011/0013572 A1* | 1/2011 | Huang | H04W 72/52 370/329 |
| 2012/0182867 A1* | 7/2012 | Farrag | H04J 3/16 370/230 |
| 2014/0355502 A1 | 12/2014 | Xhafa et al. | |
| 2015/0036570 A1* | 2/2015 | Jeong | H04W 52/0216 370/311 |
| 2015/0327265 A1* | 11/2015 | Lee | H04W 72/0446 370/315 |
| 2016/0014690 A1 | 1/2016 | Xhafa et al. | |
| 2016/0066319 A1 | 3/2016 | Sakata et al. | |
| 2016/0212729 A1* | 7/2016 | Bulten | H04W 72/51 |
| 2018/0278353 A1 | 9/2018 | Tohzaka et al. | |
| 2019/0090275 A1* | 3/2019 | Zhang | H04W 72/541 |
| 2020/0196341 A1* | 6/2020 | Mishra | H04W 72/20 |
| 2022/0086827 A1* | 3/2022 | Chai | H04B 1/715 |

FOREIGN PATENT DOCUMENTS

| | | | | |
|---|---|---|---|---|
| JP | 2016-54349 A | | 4/2016 | |
| JP | 6113917 B2 | | 4/2017 | |
| JP | 2019041264 A | * | 3/2019 | |
| JP | 6594365 B2 | | 10/2019 | |
| KR | 20220036406 A | * | 3/2022 | ........ H04W 72/0446 |
| WO | WO-2008007375 A2 | * | 1/2008 | ............ G06Q 40/04 |
| WO | WO-2013122276 A1 | * | 8/2013 | ............... H04B 7/15 |

OTHER PUBLICATIONS

Hossain et al. "A QoS-aware dynamic bandwidth allocation scheme for multi-hop WiFi-based long distance networks", EURASIP Journal Wireless Communications Networking, No. 1, pp. 1-18, 2015. (Year: 2015).*

Bao et al., "Distributed dynamic channel access scheduling for ad hoc networks", Journal of Parallel and Distributed Computing vol. 63, Issue 1, Jan. 2003, pp. 3-14 (Year: 2003).*

* cited by examiner

WIRELESS COMMUNICATION DEVICE, COMMUNICATION SYSTEM, WIRELESS COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2021-023099, filed on Feb. 17, 2021; the entire contents of which are incorporated herein by reference.

FIELD

Embodiments described herein relate generally to a wireless communication device, a communication system, a wireless communication method, and a computer program product.

BACKGROUND

Wireless sensor network techniques performing time division communication in consideration of power saving performance have been conventionally known. As to the conventionally known exemplary wireless sensors, communication is performed in minimum required transmission/reception slots among slots that are time-divided by a time division communication method and the other slots sleep. Additionally, for example, a technique is conventionally known that, when a larger quantity of data is transmitted, a wireless sensor performs communication for a larger quantity of data by using a slot that is assigned in advance.

However, in the conventional techniques, it is difficult to transmit and receive a larger quantity of data in a short processing time.

DETAILED DESCRIPTION

According to an embodiment, a wireless communication device is included in a multi-hop network in which data is relayed in multiple stages in time division communication. The wireless communication device includes one or more hardware processors configured to function as a decision unit and a communication processing unit. The decision unit decides an additional slot, based on identification information received from a child node that transmits data to the wireless communication device. The communication processing unit transmits and receives data using the additional slot and a basic slot assigned based on frame information in the time division communication. Embodiments of a wireless communication device, a communication system, a wireless communication method, and a computer program product are hereinafter described in detail with reference to the attached drawings.

First Embodiment

First, a device structure of a wireless communication system according to a first embodiment is described.

Exemplary Device Structure

Figure 1:
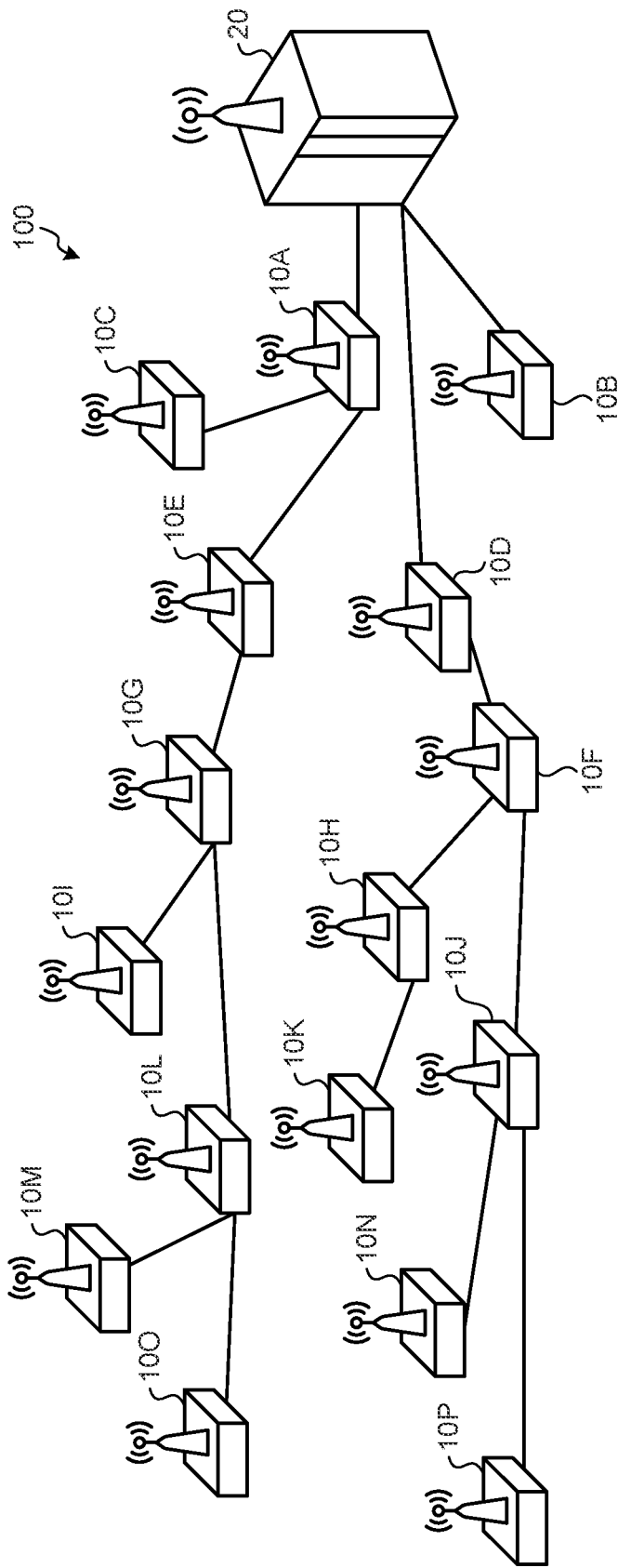
FIG. 1 is a diagram illustrating an exemplary device structure of a wireless communication system according to a first embodiment.

FIG. 1 is a diagram illustrating an exemplary device structure of a wireless communication system 100 in the first embodiment. The wireless communication system 100 in the first embodiment includes wireless communication devices 10A to 10P and an aggregation device 20. The wireless communication devices 10A to 10P are hereinafter simply referred to as wireless communication devices 10 unless the wireless communication devices 10A to 10P are distinguished.

In the wireless communication system 100, the wireless communication devices 10 and the aggregation device 20 that are disposed in a predetermined range can communicate with each other wirelessly. Data transmitted by each wireless communication device 10 is transmitted to the aggregation device 20 directly or through another wireless communication device 10. The aggregation device 20 aggregates the data transmitted from each wireless communication device 10.

Figure 2:
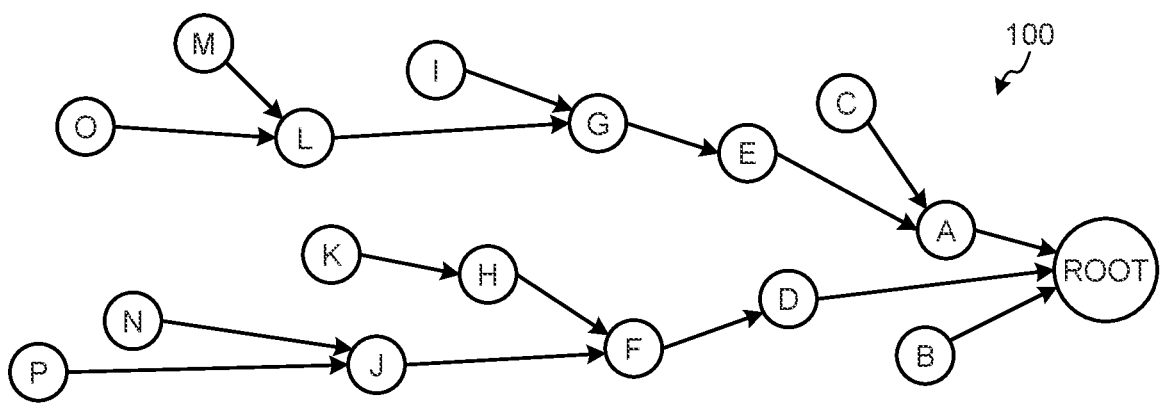
FIG. 2 is a schematic diagram illustrating the wireless communication system in FIG. 1 in a form of a network topology.

FIG. 2 is a schematic diagram illustrating the wireless communication system 100 in FIG. 1 in a form of a network topology. The alphabets denote the wireless communication devices 10 (wireless nodes) and the root denotes the aggregation device 20 (root node). In addition, the arrows denote transmission routes of information. The origin of the arrow denotes a transmission source (child node) of the information and the head of the arrow denotes a transmission destination (parent node) of the information. For a certain node, a parent node is a node with one fewer hops than the certain node and corresponds to a transmission destination node for the certain node. For a certain node, a child node is a node with one more hops than the certain node and the certain node is a transmission destination node for the child node. In the description below, the wireless communication device is a wireless node, the transmission source of the data is the child node, and the transmission destination of the data is the parent node.

Figure 3A:
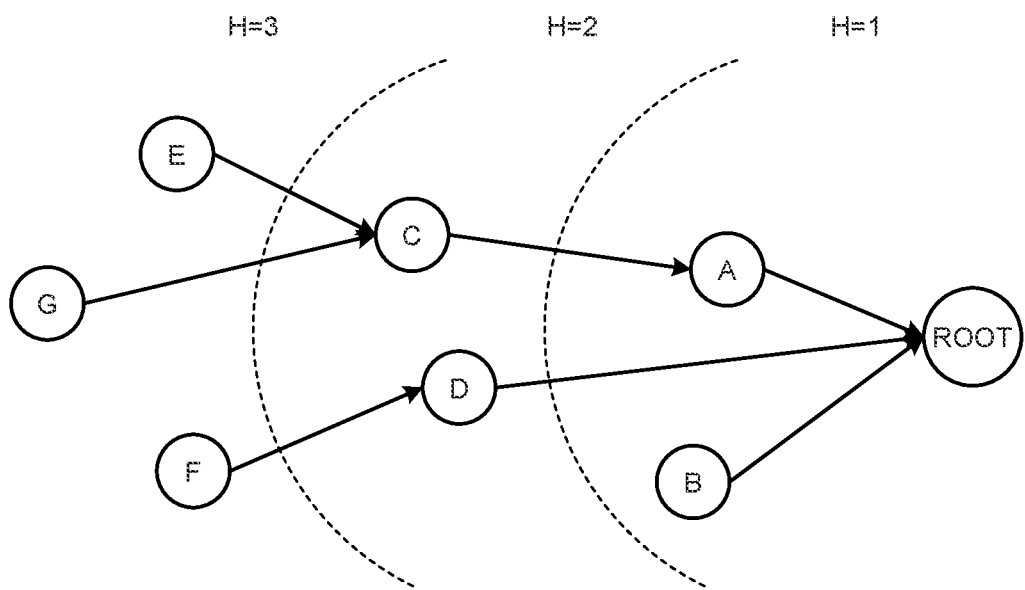
FIG. 3A is a diagram illustrating an exemplary multi-hop network in the first embodiment.

FIG. 3A is a diagram illustrating an exemplary multi-hop network according to the first embodiment. To help the understanding, the number of wireless nodes in FIG. 3A is smaller than that in FIG. 1 and FIG. 2. An operation example of the wireless nodes in a case where the wireless communication system 100 operates in the multi-hop network in time division communication is hereinafter described.

In the example in FIG. 3A, the number of hops of the wireless nodes A and B is one, the number of hops of the wireless nodes C and D is two, and the number of hops of the wireless nodes E, F, and G is three.

Figure 3B:
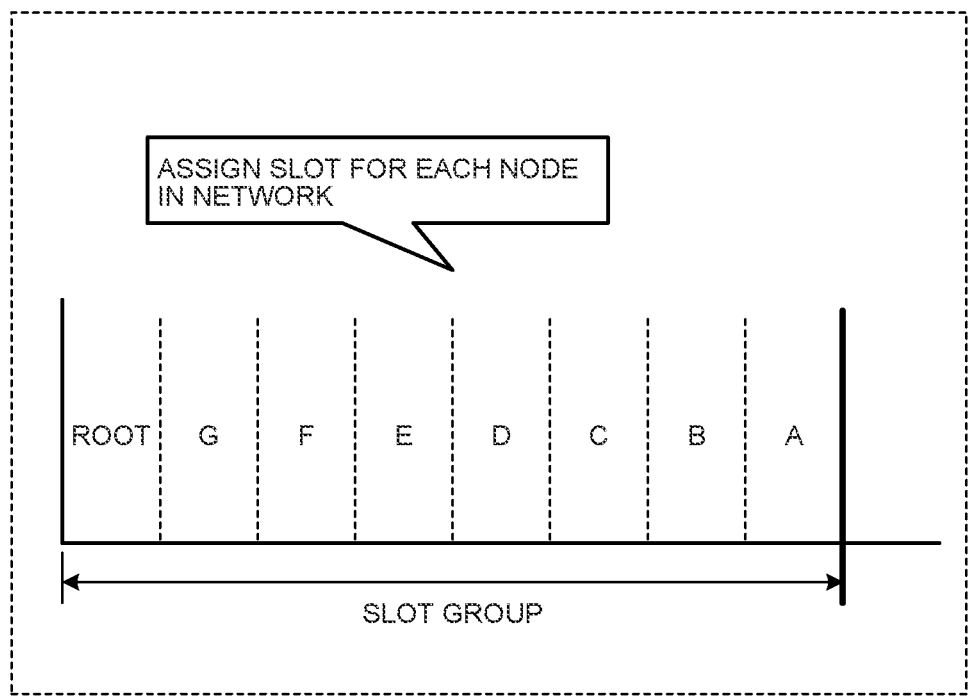
FIG. 3B is a diagram illustrating an example of assigning a slot group in the multi-hop network in FIG. 3A.
Figure 3C:
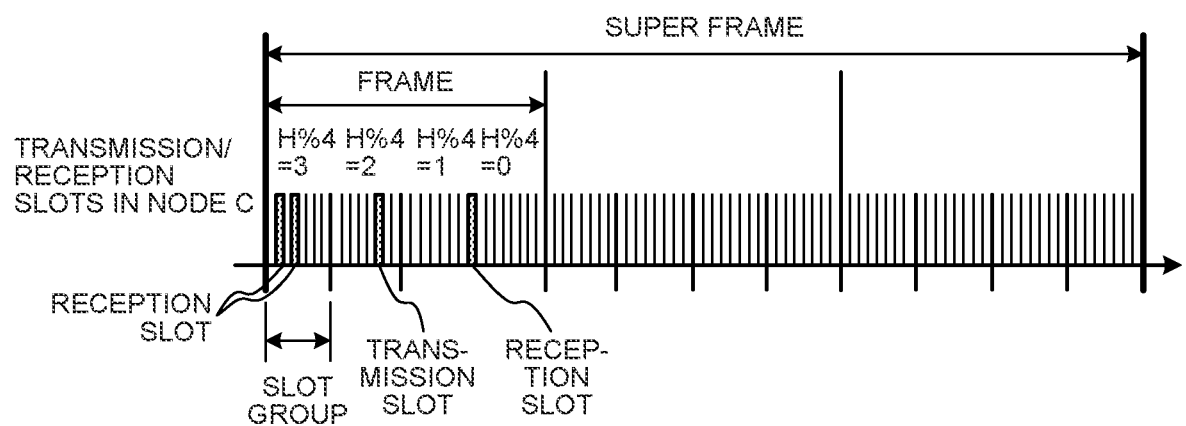
FIG. 3C is a diagram illustrating an example of transmission/reception slots in one frame of a node C in FIG. 3A.

FIG. 3B is a diagram illustrating an example of assigning a slot group in the multi-hop network in FIG. 3A. FIG. 3C is a diagram illustrating an example of transmission/reception slots in one frame of the wireless node C in FIG. 3A. In the first embodiment, one communication period is referred to as a super frame. The super frame includes one or a plurality of the frames (in the example in FIG. 3C, three frames are included). The frame includes one or a plurality of the slot groups (in the example in FIG. 3C, four slot groups are included). As illustrated in FIG. 3B, the slot group includes an independent slot (time slot) for each wireless node in the wireless communication system 100 (in the example in FIG. 3B, eight slots are included). Information that defines the super frame, the frame, the slot group, and the slot is hereinafter referred to as frame information in the time division communication.

In the wireless communication device 10 (wireless node) in the first embodiment, there are a normal mode and a burst mode. In the normal mode, the data is transmitted and received on the basis of the frame information in the time division communication, and in the burst mode, the data is transmitted and received in the slot used in the normal mode (basic slot) and additionally in another slot (additional slot). The details of the burst mode are described below.

In the normal mode, the slot group to be used in the transmission is fixed on the basis of the remainder of the division of the number of hops by the total of the slot groups in the frame, and the slot to be used in the transmission in the slot group is fixed on the basis of identification information of the wireless node. In the case of the wireless node C in FIG. 3C, since the number of hops is two, the transmission is performed in the slot assigned to the wireless node C in the slot group where the remainder of the division of the number of hops by the number of slot groups four is two. Moreover, in order to receive the data from the child nodes (the wireless nodes E and G), the wireless node C performs the reception in the transmission slots for the child nodes. Furthermore, in order to confirm whether the data has been transmitted to the parent node (the wireless node A) of the wireless node C, the node C performs the reception in the transmission slot for the parent node. As described above, the data can be relayed and transmitted.

In a case where the frames exist in one super frame and the accumulated data that is non-transmitted exists in the wireless node, the transmission and the reception are performed also in the next frame.

Figure 3D:
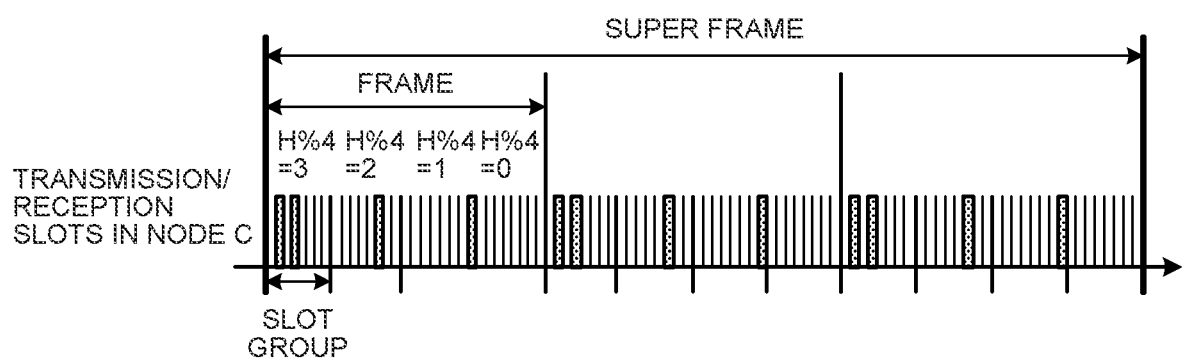
FIG. 3D is a diagram illustrating an example of the transmission/reception slots in a case where the node C in FIG. 3A performs transmission and reception in a plurality of the frames.

FIG. 3D is a diagram illustrating an example of the transmission/reception slots in a case where the node C in FIG. 3A performs the transmission and the reception in the frames. As illustrated in FIG. 3D, the wireless node C may continue the transmission and the reception in the super frame until the transmission of the non-transmitted data is completed. Note that the number of frames in one super frame is not limited to two or more, and the number of frames in one super frame may be one.

Exemplary Function Structure

Figure 4:
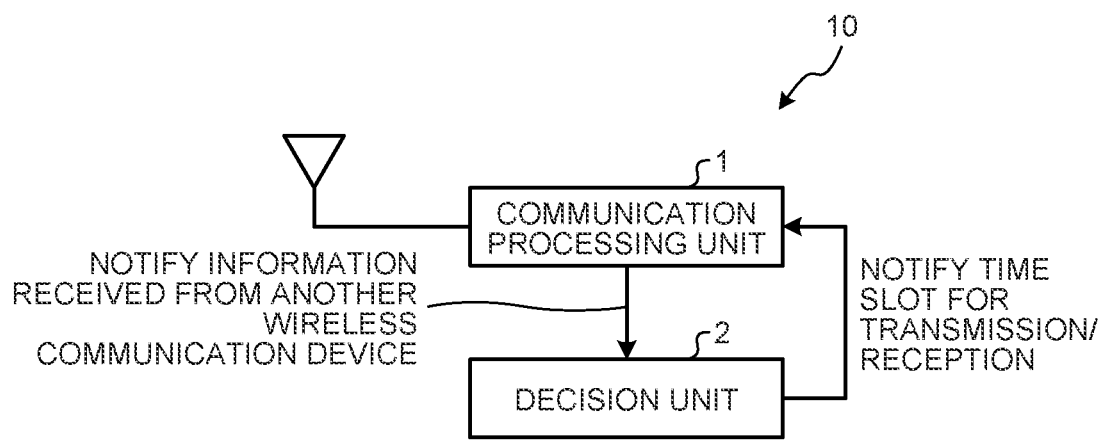
FIG. 4 is a diagram illustrating an exemplary function structure of a wireless communication device according to the first embodiment.

FIG. 4 is a diagram illustrating an exemplary function structure of the wireless communication device 10 in the first embodiment. The wireless communication device 10 in the first embodiment is the wireless node that relays the data in multiple stages in the time division communication. The wireless communication device 10 includes a communication processing unit 1 and a decision unit 2.

The communication processing unit 1 transmits and receives the data to and from another wireless node. The data to be transmitted and received may be arbitrary data. The data to be transmitted and received includes, for example, sensor data that is obtained by a sensor in each wireless node.

The decision unit 2 decides, in the normal mode, the basic slot to be used in the transmission and the reception on the basis of the frame information in the time division communication (see FIG. 3B and FIG. 3C, for example) and the identification information of the wireless communication device 10 (wireless node). For example, the identification information is an ID for identify each of one or more wireless communication devices 10 (in FIG. 1, the wireless communication devices 10A to 10P) in the multi-hop network.

In addition, the decision unit 2 further decides, in the burst mode, the additional slot to be used in the transmission and the reception on the basis of the identification information that is received from another wireless node. The additional slot that is used in the burst mode is described below with reference to FIG. 7.

In the first embodiment, an operation mode (normal mode or burst mode) of the wireless communication device 10 is decided on the basis of setting of the wireless communication device 10, for example. Note that the details of dynamic switching control for the operation mode (normal mode or burst mode) are described in a fourth embodiment.

Figure 5:
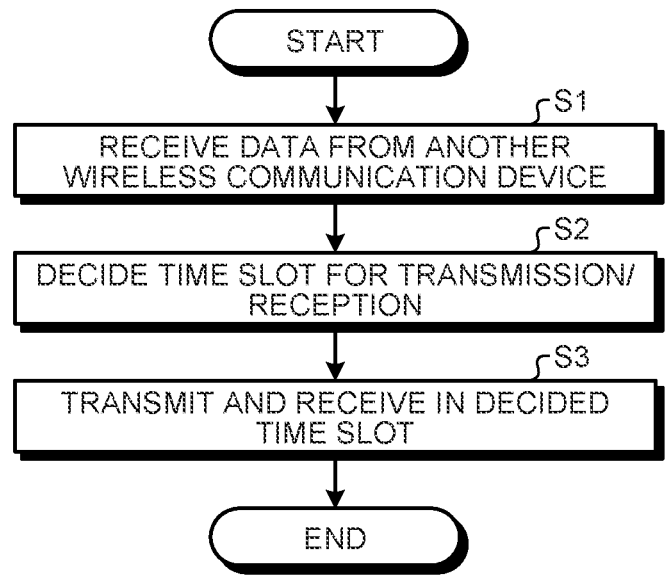
FIG. 5 is a flowchart illustrating an exemplary wireless communication method according to the first embodiment.

FIG. 5 is a flowchart illustrating an exemplary wireless communication method in the first embodiment. First, the communication processing unit 1 receives the data that is transmitted from another wireless communication device 10 (child node) (step S1). The data that is received in the process at step S1 includes the identification information of one or more wireless communication devices 10.

Next, the decision unit 2 decides the slot (time slot) to be used in the transmission and the reception (step S2). Specifically, the decision unit 2 decides, in the normal mode, the basic slot to be used in the transmission and the reception on the basis of the frame information in the time division communication and the identification information of the wireless communication device 10.

Figure 6:
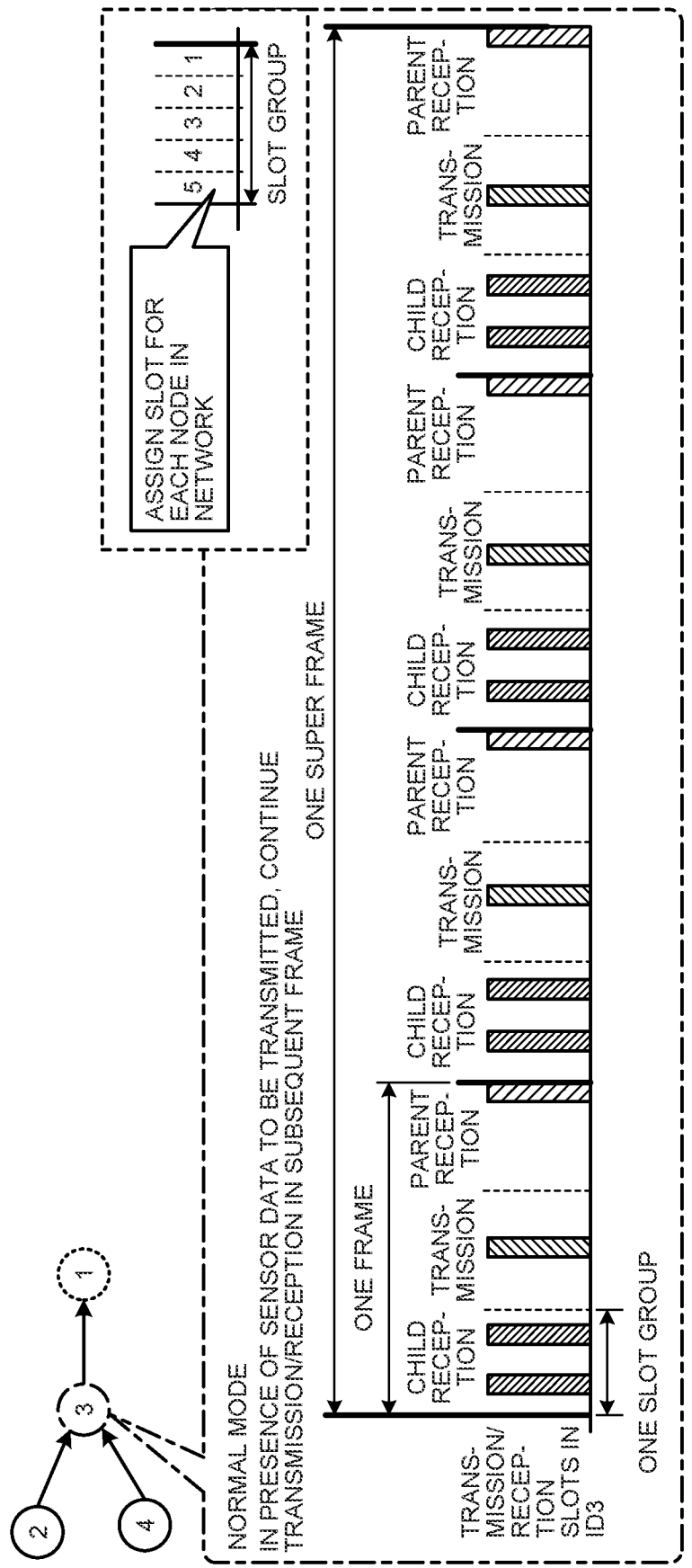
FIG. 6 is a diagram illustrating an example of the transmission/reception slots (in a normal mode) in the first embodiment.

FIG. 6 is a diagram illustrating an example of the transmission/reception slots (in the normal mode) in the first embodiment. FIG. 6 is the diagram illustrating the transmission/reception slots in wireless node ID3 (the identification information is 3) in the normal mode (not in the burst mode). The slot group includes five slots. The assignment of the slot in the slot group to each wireless node is as illustrated in FIG. 6. The wireless node ID3 transmits the data in the transmission slot that is assigned to the wireless node ID3 in the slot group to be used in the transmission of the wireless node ID3. Moreover, the wireless node ID3 receives the data in the transmission slots for the child nodes (the wireless nodes ID2 and ID4) and the transmission slot for the parent node (the wireless node ID1).

In addition, the decision unit 2 further decides, in the burst mode, the additional slot to be used in the transmission and the reception on the basis of the identification information that is received from another wireless node.

Figure 7:
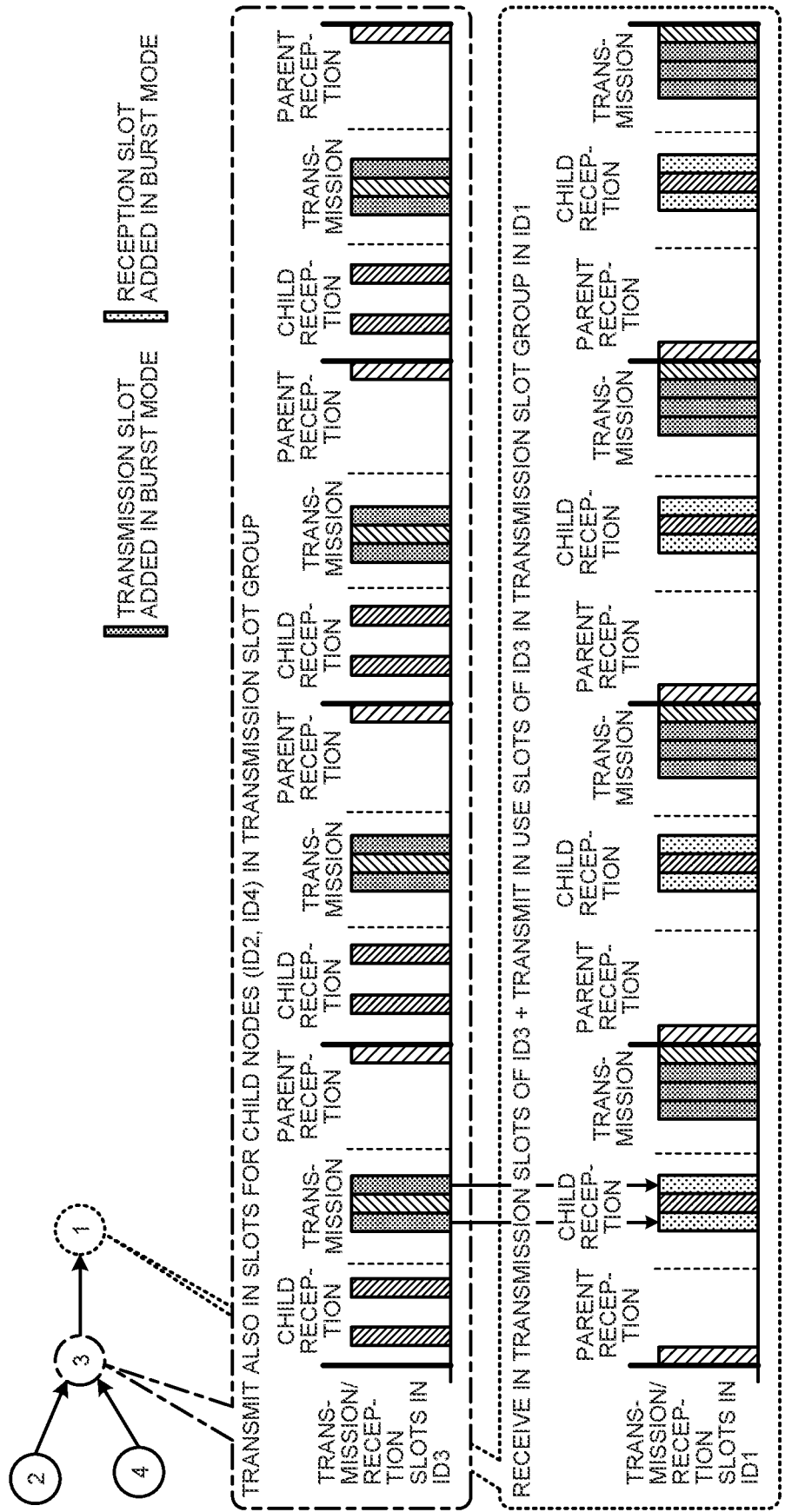
FIG. 7 is a diagram illustrating an example of the transmission/reception slots (in a burst mode) in the first embodiment.

FIG. 7 is a diagram illustrating an example of the transmission/reception slots (in the burst mode) in the first embodiment. In the example in FIG. 7, the wireless node ID3 operates in the burst mode. The assignment of the slot in the slot group to each wireless node (assignment of the basic slot) is the same as that in FIG. 6.

The decision unit 2 decides the additional slot to be used in the transmission additionally using the identification information of the wireless node (child node) that connects to the wireless node ID3. As illustrated in FIG. 7, the communication processing unit 1 performs the transmission in the slots that are assigned to the IDs of the child nodes (in FIG. 7, the slots for ID2 and ID3) in addition to the slot that is assigned to the wireless node ID3 (basic slot) in the slot group to be used in the transmission in the wireless node ID3.

Moreover, in a case where the child node (in FIG. 7, the wireless node ID3) performs the transmission using the additional slot, the parent node that receives the data (in FIG. 7, the wireless node ID1) performs the reception in the slots in which the child node performs the transmission (the slots corresponding to ID2, ID3, and ID4). Furthermore, the parent node decides the additional slots to be used in the transmission (in FIG. 7, the slots corresponding to ID2, ID3, and ID4) on the basis of the identification information of the child node (in FIG. 7, the wireless node ID3) and the identification information of the wireless nodes that connect to this child node (in FIG. 7, the wireless nodes ID2 and ID4).

Back to FIG. 5, finally, the communication processing unit 1 transmits and receives the data in the slots decided in the process at step S2 (step S3).

Note that even in a case where a slot structure in the time division communication is different from the structure illustrated in FIG. 6, the decision unit 2 decides the slot where the communication is performed using the notified identification information similarly to the case in FIG. 6. In addition, as illustrated in FIG. 7, the identification information may be the identification information of the child node or the identification information of another child node that further connects to that child node. That is to say, the decision unit 2 decides the additional slot using the identification information of the wireless node with more hops than the device including the decision unit 2.

The method of confirming the data delivery in a case where the number of communication slots is increased (method of sending back ACK information) may be arbitrarily determined. For example, the ACK information for the communication slot used in the data transmission to the parent node may be received in the transmission slot for the parent node and the determination may be performed (see FIG. 8). Moreover, for example, unicast communication may be performed and the ACK information for confirming the delivery may be sent back just after the transmission (see FIG. 9).

Figure 8:
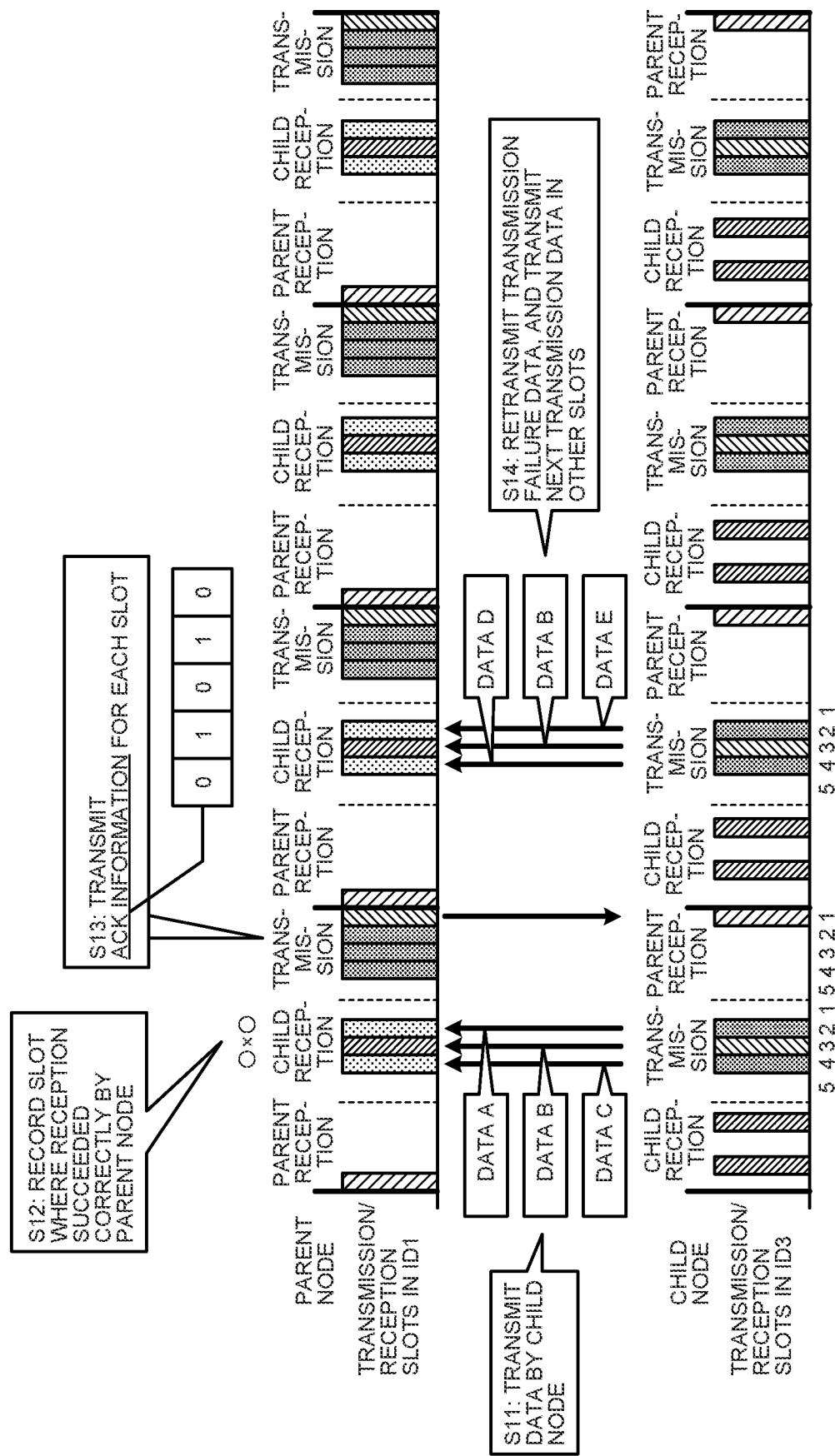
FIG. 8 is a diagram illustrating an example 1 of a method of sending back ACK information in the first embodiment.

FIG. 8 is a diagram illustrating an example 1 of the method of sending back the ACK information in the first embodiment. FIG. 8 illustrates a method in which the ACK information for the communication slot is received from the parent node. In FIG. 8, an upper side is the transmission/reception slots in the parent node, and a lower side is the transmission/reception slots in the child node connected to the parent node. First, the child node transmits, in three slots used for the transmission, data A, B, and C that are different from each other to the parent node (step S11).

Next, the parent node records whether the reception is possible (reception success or reception failure) for each slot (step S12). Subsequently, the parent node transmits the ACK information (reception possible/impossible information) for each slot, in the basic slot (in FIG. 8, the slot corresponding to ID1) (step S13). For example, on the assumption that the reception success (ACK) corresponds to 1, the parent node transmits, to the child node, a bit sequence (0, 1, 0, 1, 0) corresponding to the slot group (5, 4, 3, 2, 1) including the slots corresponding to ID1 to ID5.

Then, the child node transmits the non-transmitted data in the slot where the reception has succeeded, and transmits again the data in the slot where the transmission has failed (step S14). In FIG. 8, the child node transmits again only the data B, and transmits new data (data D and E) in the other slots.

Figure 9:
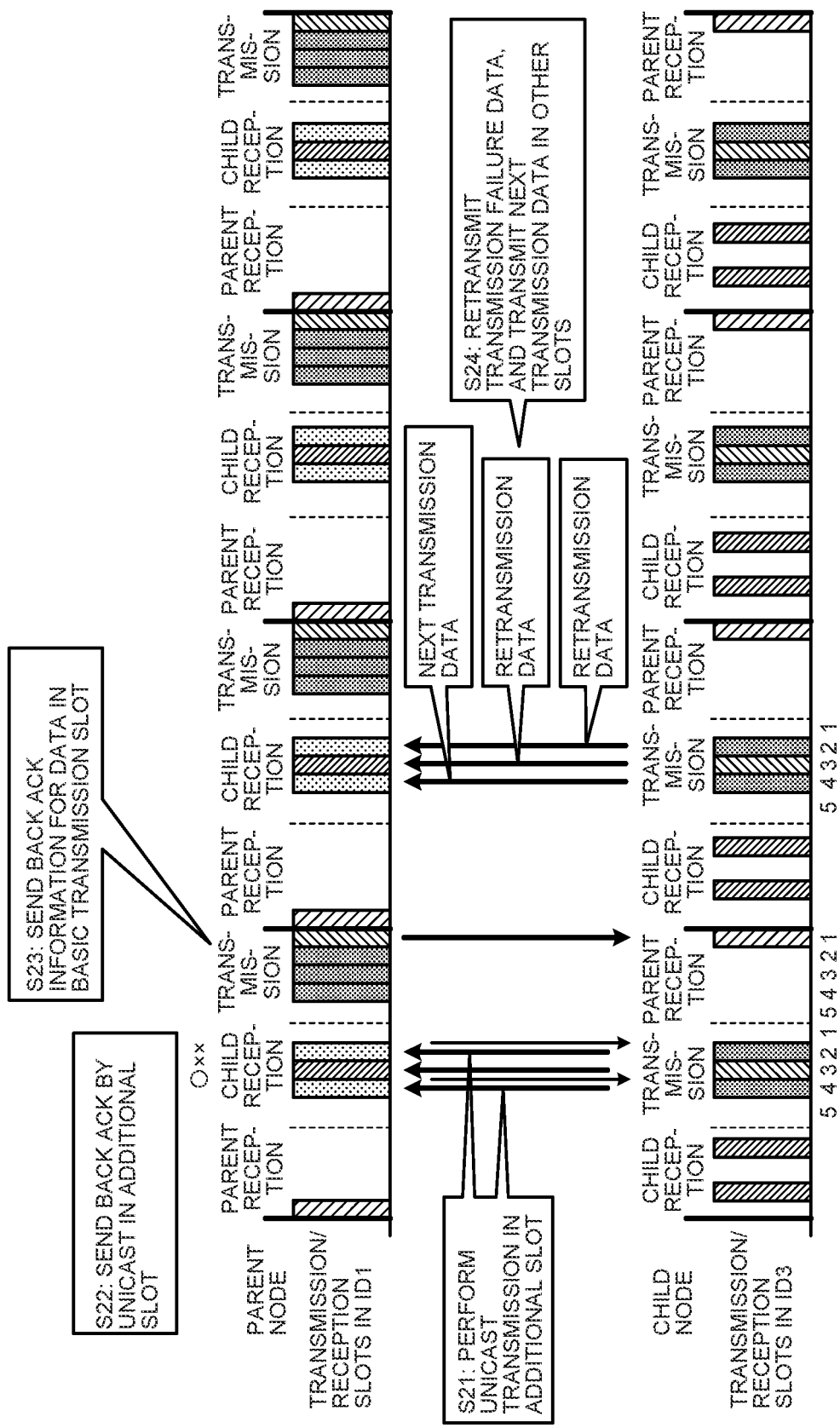
FIG. 9 is a diagram illustrating an example 2 of the method of sending back the ACK information in the first embodiment.

FIG. 9 is a diagram illustrating an example 2 of the method of sending back the ACK information in the first embodiment. FIG. 9 illustrates a method of confirming the data delivery in the unicast communication. First, the child node transmits the data by multicast transmission or broadcast transmission in the basic slot (in FIG. 9, the slot corresponding to ID3), and transmits the data by unicast transmission in the additional slots (in FIG. 9, the slots corresponding to ID2 and ID4) (step S21). In the unicast transmission, the ACK information is immediately sent back from the parent node (step S22).

In FIG. 9, the data transmission succeeds in the additional slot corresponding to ID4, but fails in the slots corresponding to ID2 and ID3. At this time, the delivery in the basic slot is confirmed on the basis of the transmission information from the parent node (step S23). Note that even in the basic slot, the unicast communication may be used.

Next, the child node transmits the non-transmitted data in the slot where the transmission has succeeded, and transmits retransmission data in the other slots (step S24). As above, by using the additional slot, the delivery is confirmed and the non-transmitted data is transmitted.

As described above, in the wireless communication device 10 according to the first embodiment, the decision unit 2 decides the additional slot on the basis of the identification information received from the child node that transmits the data to the wireless communication device 10. Then, the communication processing unit 1 transmits and receives the data using the additional slot and the basic slot assigned on the basis of the frame information in the time division communication (see FIG. 3B, for example).

Thus, in the wireless communication device 10 according to the first embodiment, since the communication slot in the time division communication is expanded by the additional slot, a larger quantity of data can be transmitted and received in shorter time. That is to say, in the wireless communication device 10 according to the first embodiment, since the unused slot is efficiently used, communication timing can be further increased. Therefore, a larger quantity of data can be transmitted per unit time. For example, in the wireless communication device 10 according to the first embodiment, a larger quantity of data can be communicated in one communication period (for example, within one super frame), which is advantageous.

In the conventional techniques, when the communication is performed in the time division communication, since the transmission and the reception are performed using only the unique slot that is assigned in advance, a wireless equipment can sleep except in the necessary transmission and reception and an electricity consumption quantity can be reduced. However, if the quantity of the transmission data is large, it takes much time to finish transmitting all the data.

Moreover, in the conventional techniques, even in a case where the number of slots for the transmission is increased, the slot is added while avoiding interference due to sharing of the slot. Thus, it is necessary to generate a list in which the available slots are recorded. By generating the list, an idle slot can be determined. However, there is the problem that generating the list requires the transmission and reception of a large quantity of data and much time.

On the other hand, in the wireless communication device 10 according to the first embodiment, the additional slot is decided on the basis of the identification information that is received from another wireless communication device 10 (child node) in the normal transmission/reception. Thus, a larger quantity of data can be transmitted per unit time without requiring the transmission and reception of a large quantity of data and much time.

Second Embodiment

Next, a second embodiment is described. In the description of the second embodiment, the description similar to that of the first embodiment is omitted, and the points different from those of the first embodiment are described. In a structure described in the second embodiment, even if transmission timings overlap with each other, the interference does not occur.

First, an example in which the first embodiment is applied is described, and in this example, the interference occurs due to the multistage relays.

Figure 10:
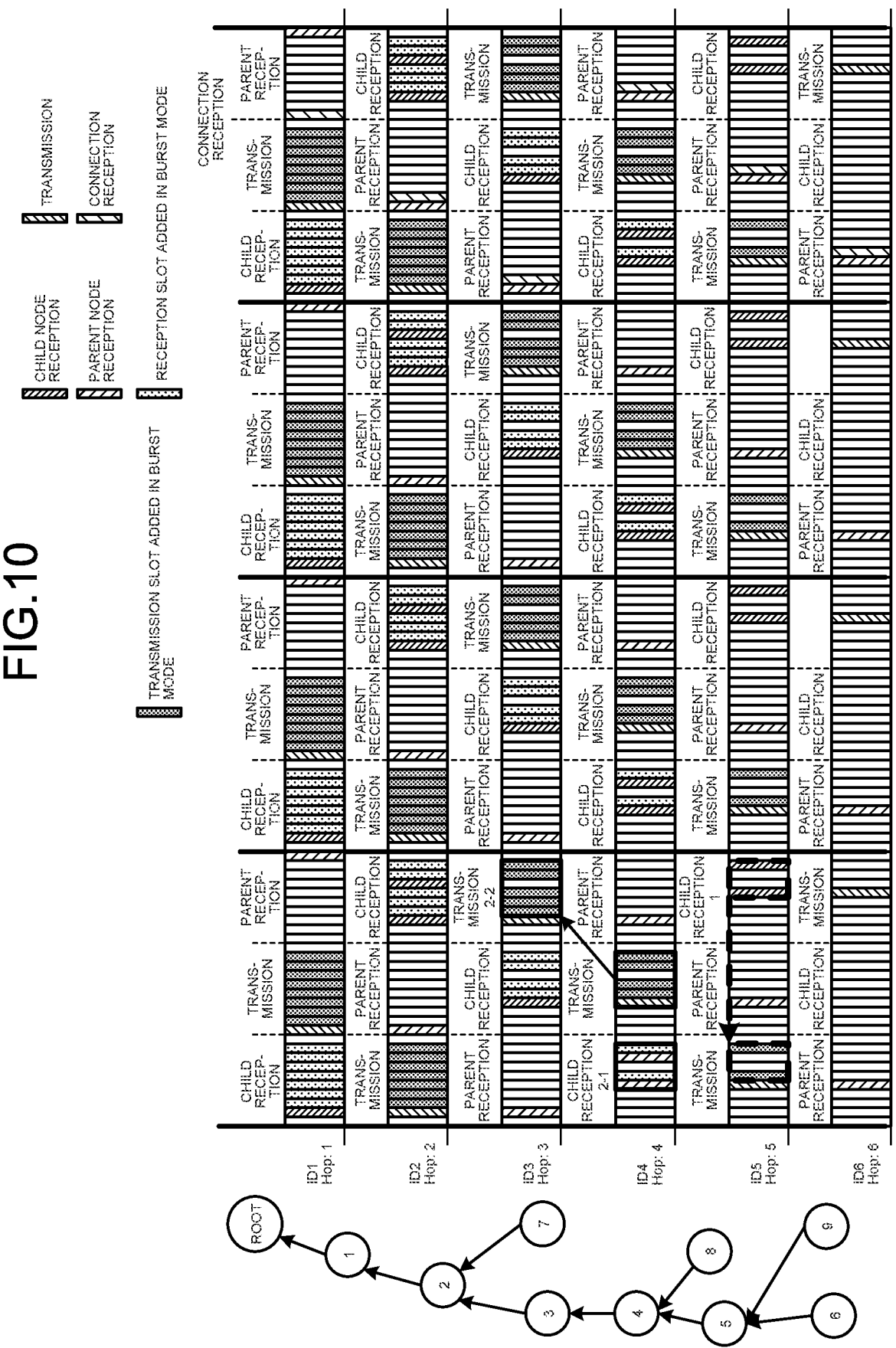
FIG. 10 is a diagram illustrating an operation example of a wireless node in the first embodiment.

FIG. 10 is a diagram illustrating an operation example of the wireless node in the first embodiment. FIG. 10 illustrates an operation of the wireless nodes from the aggregation device 20 to the wireless node in sixth hop in the case where the first embodiment is applied. In the example of FIG. 10, the slot group includes ten slots. The slots in the slot group are assigned to, in the order from the left side, the basic slots for the wireless nodes ID1 to ID9 and the root node (the aggregation device 20).

The method of deciding the basic slot and the additional slot is similar to that described in the first embodiment. For example, when the burst mode is started, the wireless node ID5 also uses, as the transmission slot, the basic slots for the child nodes (in FIG. 10, the wireless nodes ID6 and ID9), and the wireless node ID5 transmits, to the parent node, the fact that the burst mode has been started (1 in FIG. 10).

When the wireless node ID4 receives the data of the burst mode from the child nodes (in FIG. 10, the wireless nodes ID5 and ID8), the wireless node ID4 receives the data in the transmission slots for the child nodes and the wireless node ID4 itself also starts the burst mode (2-1 in FIG. 10).

Similarly, the wireless node ID3 increases the transmission slot by using the slots used in the transmission by the child node (in FIG. 10, the wireless node ID4), as the additional slots (2-2 in FIG. 10).

Figure 11:
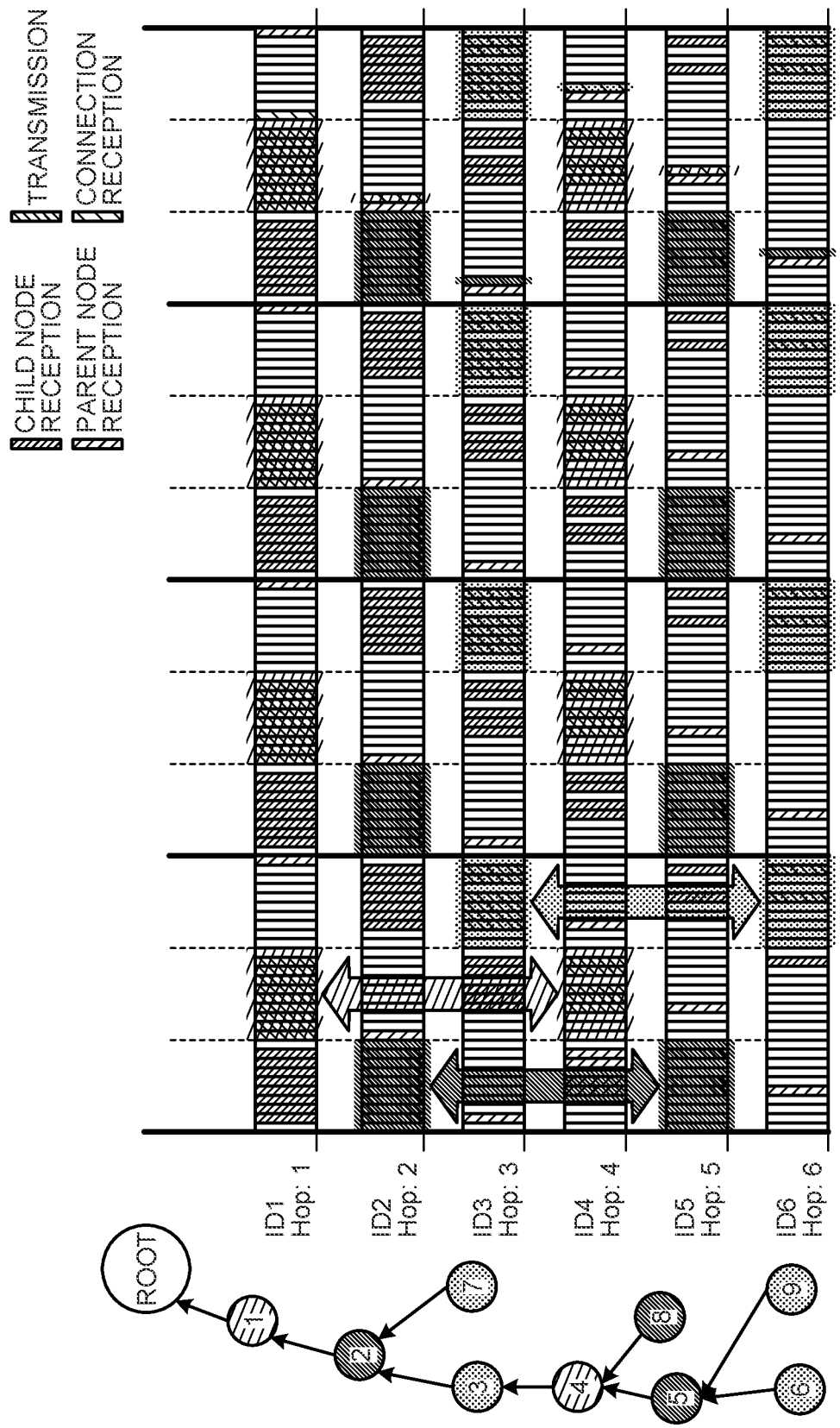
FIG. 11 is a diagram illustrating overlapping slots in the operation example in FIG. 10.

FIG. 11 is a diagram illustrating overlapping slots in the operation example in FIG. 10. As illustrated in FIG. 11, the transmission timing of the wireless node ID5 overlaps with the transmission timing of the wireless node ID2. Moreover, the transmission timing of the wireless node ID4 overlaps with the transmission timing of the wireless node ID1. Furthermore, the transmission timing of the wireless node ID6 overlaps with the transmission timing of the wireless node ID3.

Since the transmission timings overlap with each other, the interference occurs. Thus, it is necessary to avoid the interference. In the structure described in the second embodiment, the frequency to be used in the transmission and the reception is changed in order to avoid the interference and the data is transmitted and received.

In the wireless communication device 10 (wireless node) according to the second embodiment, the communication processing unit 1 sets the frequency in the data transmission on the basis of the number of hops of the wireless node and the number of subframes in one frame.

Figure 12:
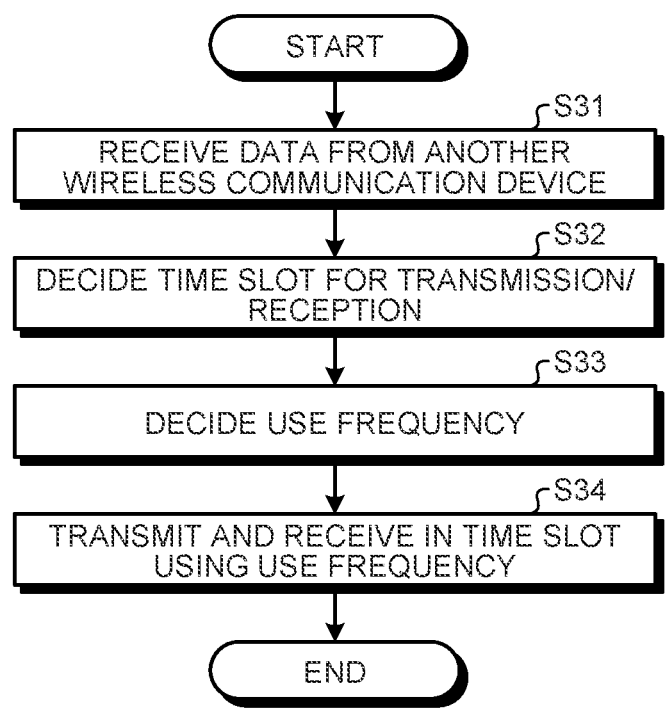
FIG. 12 is a flowchart illustrating an exemplary wireless communication method according to a second embodiment.

FIG. 12 is a flowchart illustrating an exemplary wireless communication method according to the second embodiment. Since the description of steps S31 and S32 is the same as that in the first embodiment, the description is omitted (see FIG. 5).

Next, the communication processing unit 1 decides the use frequency on the basis of the number of hops of the wireless communication device 10 (wireless node) and the frame information in the time division communication (step S33). Specifically, when deciding the use frequency, the communication processing unit 1 divides the wireless nodes into groups on the basis of the number of hops of the wireless communication device 10 and the frame information in the time division communication, and then, assigns the frequency to each group. It is assumed that the number of hops of the wireless node whose ID is A from the aggregation device 20 is HA, the number of slot groups in one frame is SG, and % is a remainder operator. In this case, a value that is obtained by dividing HA by SG and truncating the decimal places of the quotient is regarded as a group number except when HA % SG=0. When HA % SG=0, a value that is obtained by dividing HA by SG and subtracting 1 from the quotient is regarded as the group number.

For example, if the number of hops of the wireless node ID1 is 5 and the number of slot groups in one frame is 3, 5%3=2 and 5/3=1.666 . . . . In this case, since 5%3 is not 0, the communication processing unit 1 truncates the decimal places of 5/3, classifies the wireless node ID1 into a group 1, and decides the use frequency of the wireless node ID1 as the frequency assigned to the group 1.

Finally, the communication processing unit 1 transmits and receives the data in the slot decided in the process at step S32 by using the use frequency decided in the process at step S33 (step S34).

Figure 13:
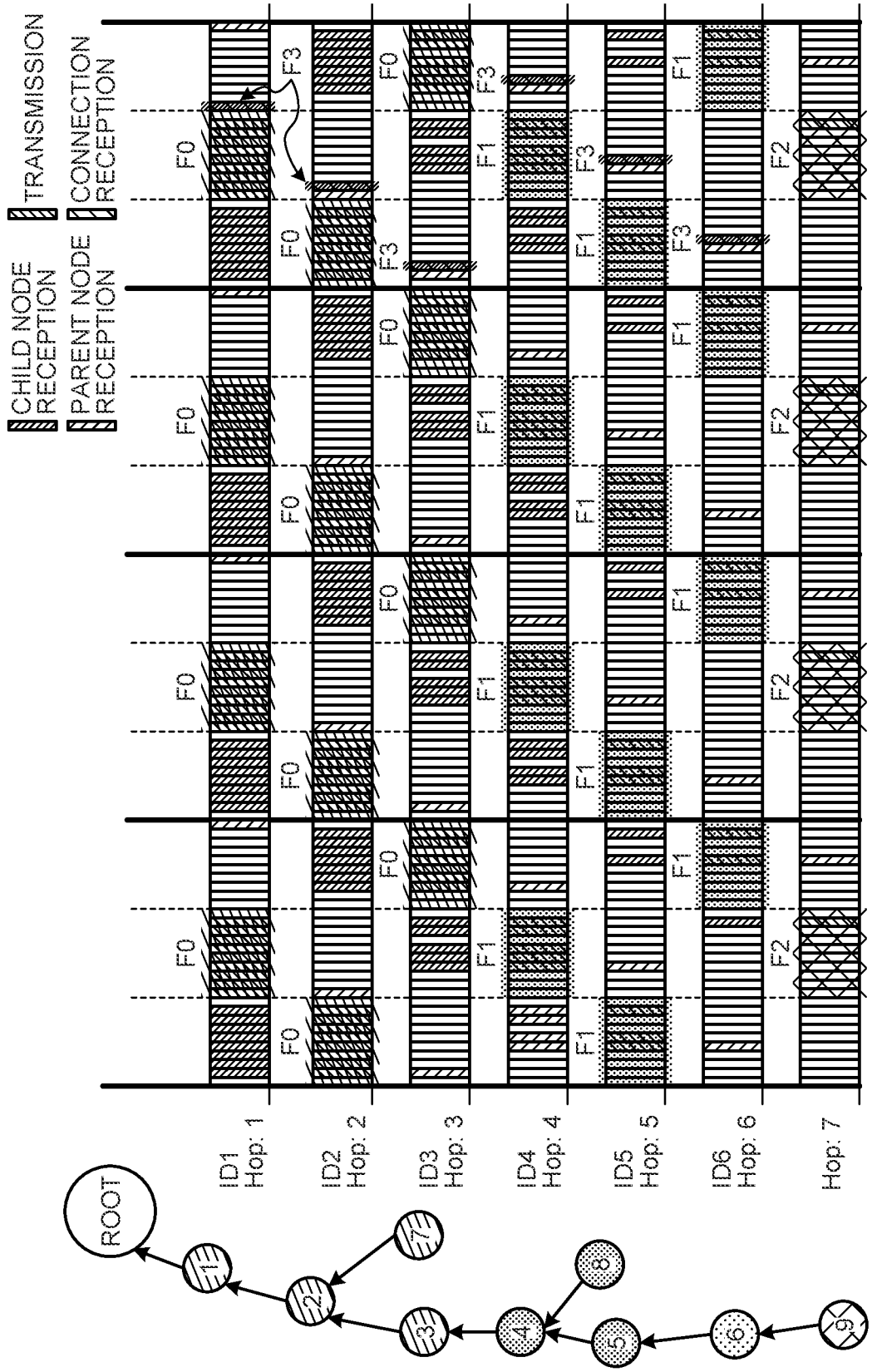
FIG. 13 is a diagram illustrating an operation example of the wireless node in the second embodiment.

FIG. 13 is a diagram illustrating an operation example of the wireless node in the second embodiment. FIG. 13 illustrates the use frequency used in the transmission slots in a case where the frequency used in a group X (X=0, 1, 2, 3) is FX. The reception slots to deal with the transmission in FIG. 13 also use the same use frequency.

As described above, in the second embodiment, the communication processing unit 1 sets the use frequency on the basis of the number of hops and the frame information. Therefore, in the second embodiment, a larger quantity of data can be transmitted per unit time while avoiding the interference in the data communication.

Third Embodiment

Next, a third embodiment is described. In the description of the third embodiment, the descriptions similar to those of the first embodiment and the second embodiment are omitted, and the points different from those of the first embodiment and the second embodiment are described. As illustrated in FIG. 13, if the different use frequency is used for each wireless node, it is impossible to determine which frequency to receive when the wireless node that newly joins the network searches for the parent node that is the connection destination.

Thus, in the wireless communication device 10 (wireless node) in the third embodiment, the communication processing unit 1 performs the transmission and the reception using a predetermined fundamental frequency (common frequency) in the above-described basic slot (the slot that is not the additional slot).

The fundamental frequency may be, for example, a predetermined frequency that is set to the wireless communication device 10 in advance or the frequency that is notified by another wireless communication device 10 (child node or parent node).

Figure 14:
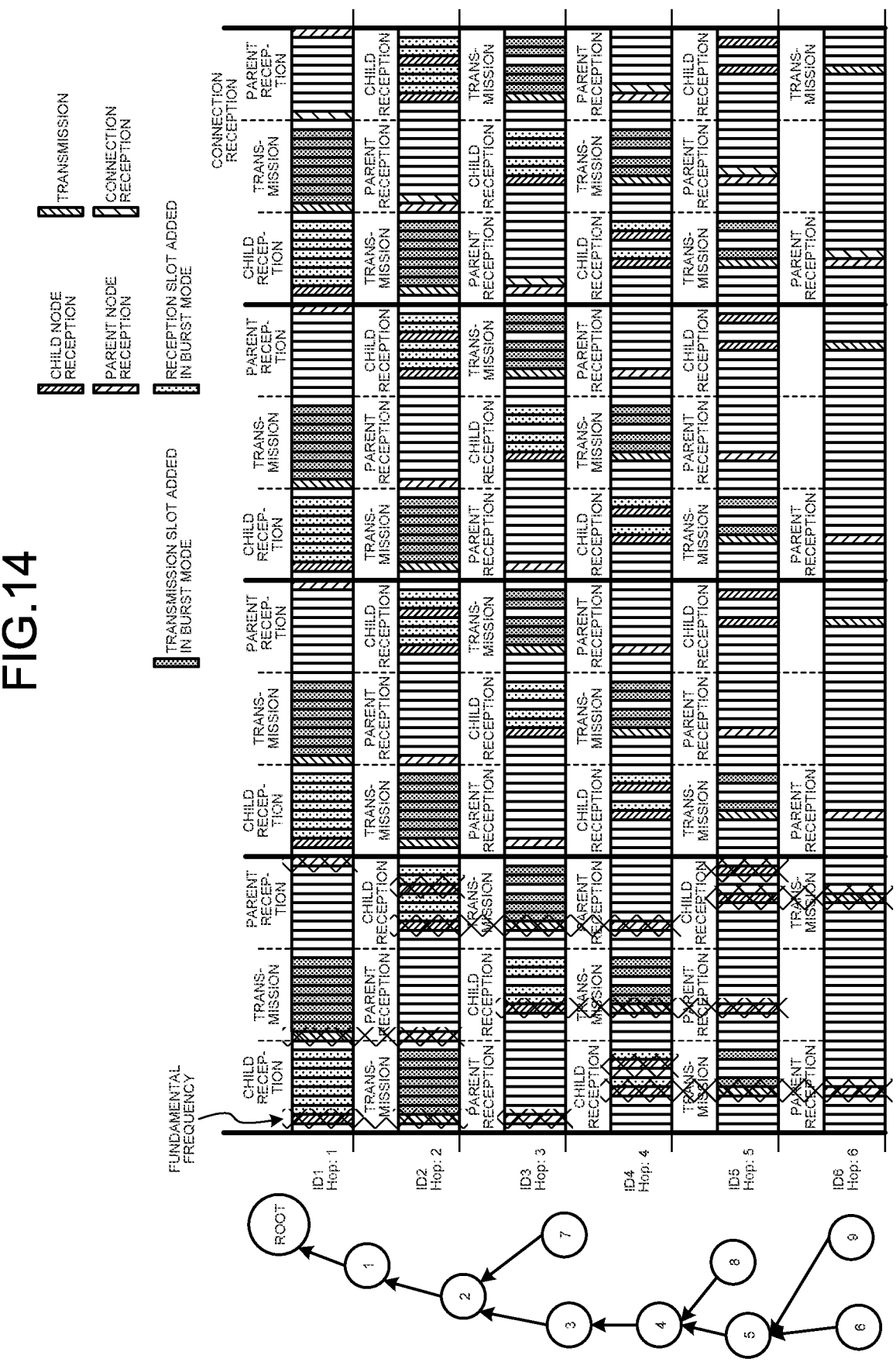
FIG. 14 is a diagram illustrating an operation example of the wireless node in a third embodiment.

FIG. 14 is a diagram illustrating an operation example of the wireless node in the third embodiment. For example, the wireless node ID1 uses the fundamental frequency in the basic slot that receives the data from the child node (in FIG. 14, the wireless node ID2), the basic slot that transmits the data to the child node, and the basic slot that receives the data from the parent node (in FIG. 14, the root node).

As illustrated in FIG. 14, the fundamental frequency is used as the frequency used in the basic slot. Thus, when the wireless node that newly joins the network searches for the fundamental frequency, the data of all the wireless nodes in the network can be received and the connection destination can be selected.

Figure 15:
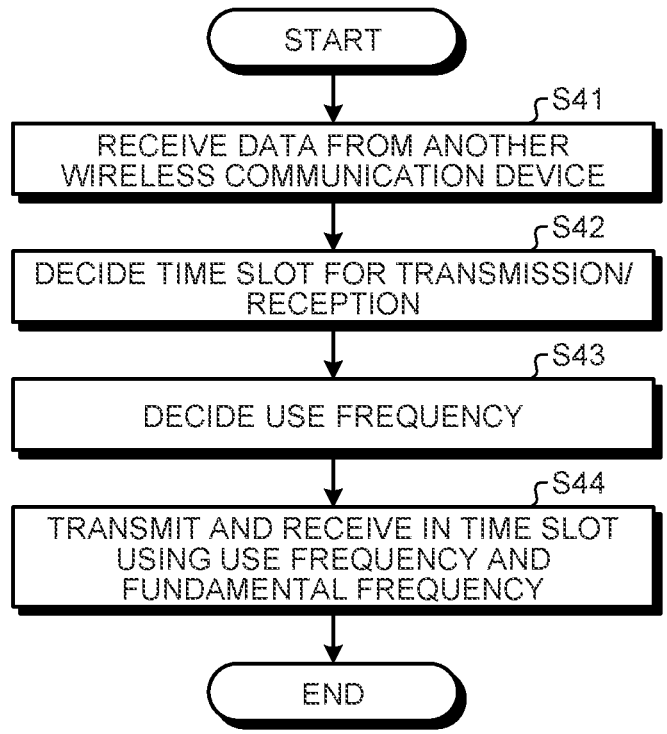
FIG. 15 is a flowchart illustrating an exemplary wireless communication method according to the third embodiment.

FIG. 15 is a flowchart illustrating an exemplary wireless communication method according to the third embodiment. Since the description of steps S41 to S43 is the same as that in the second embodiment, the description is omitted (see FIG. 12). The communication processing unit 1 transmits and receives the data in the slots decided in the process at step S42 by using the use frequency that is decided in the process at the step S43 in the additional slot, and by using the fundamental frequency in the basic slot without depending on the number of hops (step S44).

As described above, in the wireless communication device 10 according to the third embodiment, the transmission and the reception are performed using the fundamental frequency in the basic slot. Therefore, a large quantity of data can be transmitted per unit time in the state where the wireless node that newly joins the network can easily select the connection destination.

Fourth Embodiment

Next, a fourth embodiment is described. In the description of the fourth embodiment, the description similar to those of the first embodiment to the third embodiment is omitted, and the point different from those of the first embodiment to the third embodiment is described. A structure described in the fourth embodiment includes dynamic switching control for the operation mode (normal mode or burst mode).

Exemplary Function Structure

Figure 16:
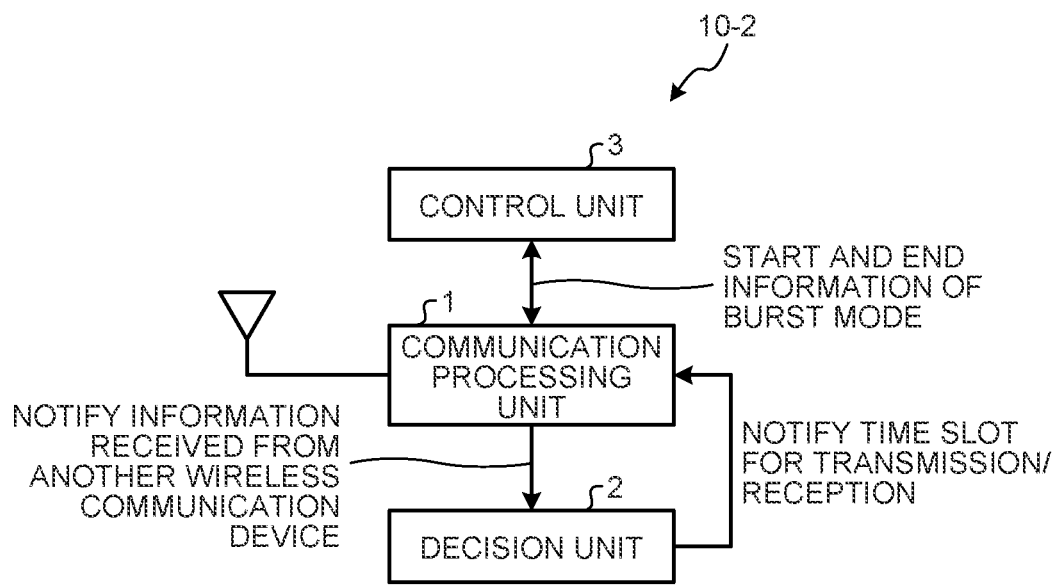
FIG. 16 is a diagram illustrating an exemplary function structure of a wireless communication device according to a fourth embodiment.

FIG. 16 is a diagram illustrating an exemplary function structure of a wireless communication device 10-2 in the fourth embodiment. The wireless communication device 10-2 includes the communication processing unit 1, the decision unit 2, and a control unit 3. In the fourth embodiment, the control unit 3 is added to the structure of the wireless communication device 10 according to the first embodiment to the third embodiment.

The control unit 3 controls a start and an end of the burst mode.

Figure 17:
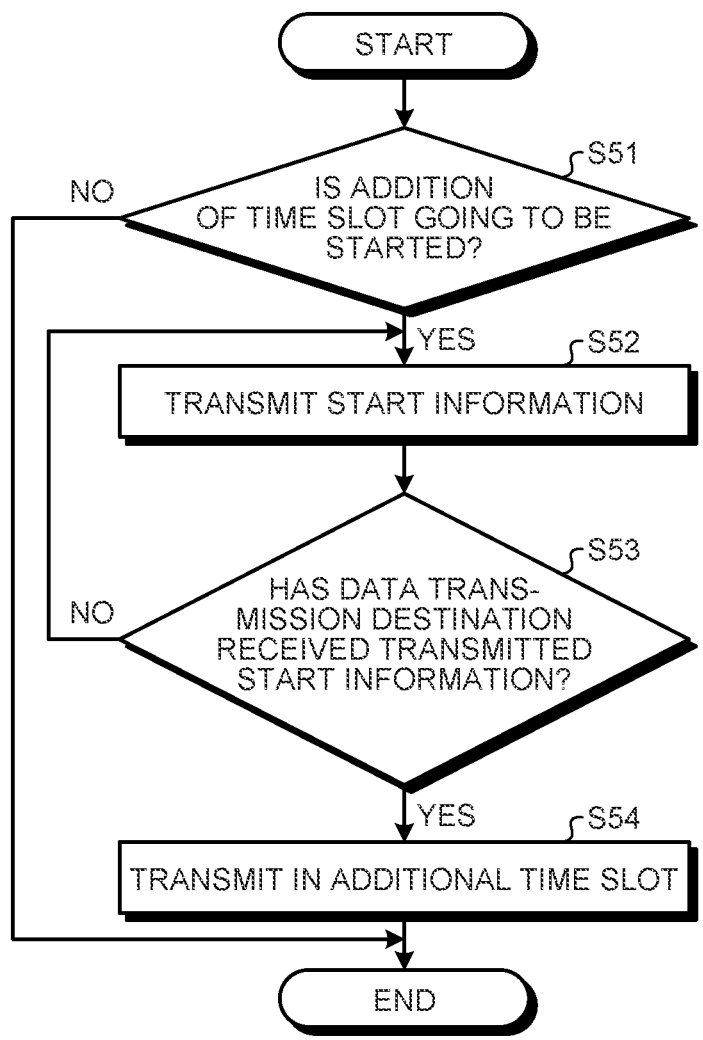
FIG. 17 is a flowchart illustrating an example of a method of starting the burst mode in the fourth embodiment.

FIG. 17 is a flowchart illustrating an example of a method of starting the burst mode in the fourth embodiment. First, the control unit 3 determines whether to start the addition of the slot (start the burst mode) (step S51). For example, whether to start the burst mode is controlled by determining a predetermined parameter by using a threshold.

The predetermined parameter may be set before power-on, or notified from another wireless communication device. Moreover, the threshold to determine the predetermined parameter may be a numerical value that is set before power-on, or a numerical value that is notified from another wireless communication device. Furthermore, if the predetermined parameter is more than or equal to the threshold, or less than the threshold, the control unit 3 may determine to start the burst mode. The predetermined parameter includes at least one of a quantity of the reception data that is received from the child node or the parent node of the wireless communication device 10, a quantity of the transmission data that is transmitted to the child node or the parent node of the wireless communication device 10, a quantity of the non-transmitted data in the wireless communication device 10, an electricity consumption quantity of the wireless communication device 10, and a battery remaining quantity of the wireless communication device 10. Moreover, these data quantities and the electricity consumption quantity may be measured in a predetermined period. For example, the quantity of the transmission data may be a quantity of the data that can be transmitted in one transmission opportunity.

For example, if the quantity of the data to be transmitted to the child node or the parent node is more than or equal to the threshold, the control unit 3 determines to start the burst mode because the quantity of the transmission data is large. Moreover, for example, if the battery remaining quantity of the wireless node is more than or equal to the threshold, the control unit 3 determines to start the burst mode because the battery remaining quantity is enough.

If the burst mode is not started (No at step S51), the additional slot is not used in the data transmission.

If the burst mode is started (Yes at step S51), the communication processing unit 1 transmits, to the transmission destination of the data (parent node), the data including start information of the burst mode (step S52). For example, the start information includes a flag representing the start of the burst mode and specific information that specifies the additional slot (for example, the ID of the wireless node).

Figure 18:
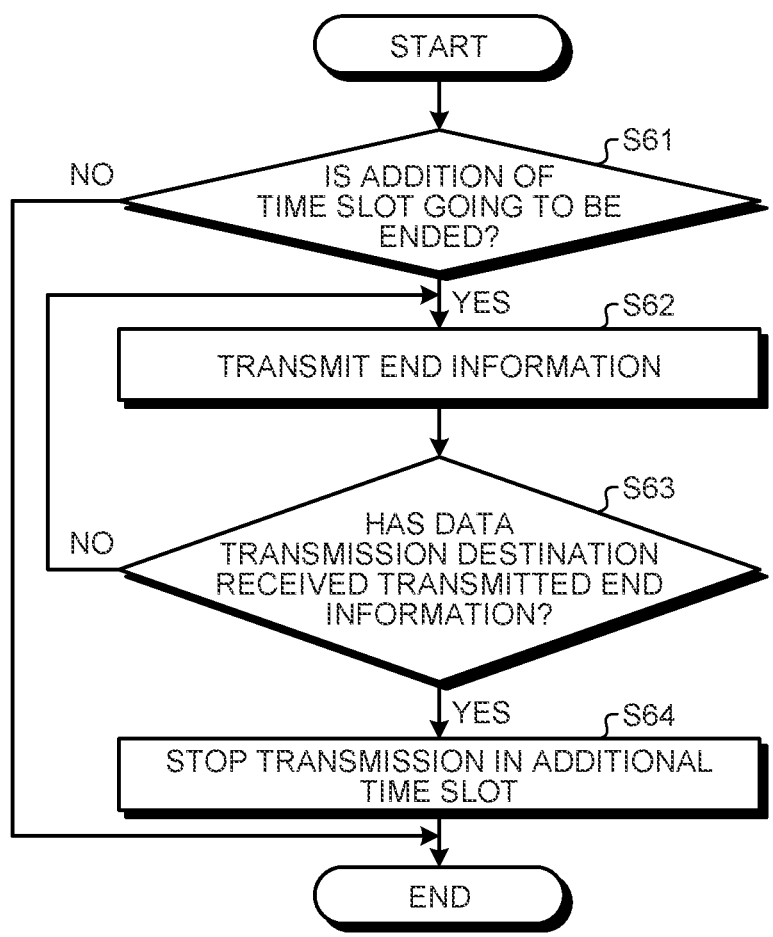
FIG. 18 is a flowchart illustrating an example of a method of ending the burst mode in the fourth embodiment.

If the start information has been received (Yes at step S53), the data is transmitted using not only the basic slot but also the additional slot (step S54). Whether the start information has been received is determined on the basis of whether the ACK information has been received from the parent node, for example. If the start information has not been received (No at step S53), the process returns to step S52. FIG. 18 is a flowchart illustrating an example of a method of ending the burst mode in the fourth embodiment.

First, the control unit 3 determines whether to end the addition of the slot (end the burst mode) (step S61). For example, whether to end the burst mode is determined by the above-described predetermined parameter.

For example, if the quantity of the data to be transmitted to the child node or the parent node is less than the threshold, the control unit 3 determines to end the burst mode because the quantity of the transmission data is small. Moreover, for example, if the battery remaining quantity of the wireless node is less than the threshold, the control unit 3 determines to end the burst mode because the battery remaining quantity is not enough.

If the burst mode is not ended (No at step S61), the additional slot is used continuously.

If the burst mode is ended (Yes at step S61), the communication processing unit 1 transmits, to the transmission destination of the data (parent node), the data including end information of the burst mode (step S62). For example, the end information includes a flag representing the end of the burst mode and the information that specifies the additional slot (for example, the ID of the wireless node). Note that since the specific information that specifies the additional slot is included in the start information, it is not necessary that the specific information is included in the end information.

If the end information has been received (Yes at step S63), the data transmission using the additional slot is stopped (step S64). Whether the end information has been received is determined on the basis of whether the ACK information has been received from the parent node, for example. If the end information has not been received (No at step S63), the process returns to step S62.

Note that the information representing the start and the end of the burst mode may be the flag representing the start and the end of the burst mode, or arbitrary information other than the flag. Moreover, the information representing the additional slot to be used may be the ID of the wireless node, or a numerical value that is assigned to each slot. Furthermore, if the additional slot can be specified in advance (if the network topology of the multi-hop network is specified), it is not necessary that the start information and the end information include the information representing the additional slot to be used.

Figure 19A:
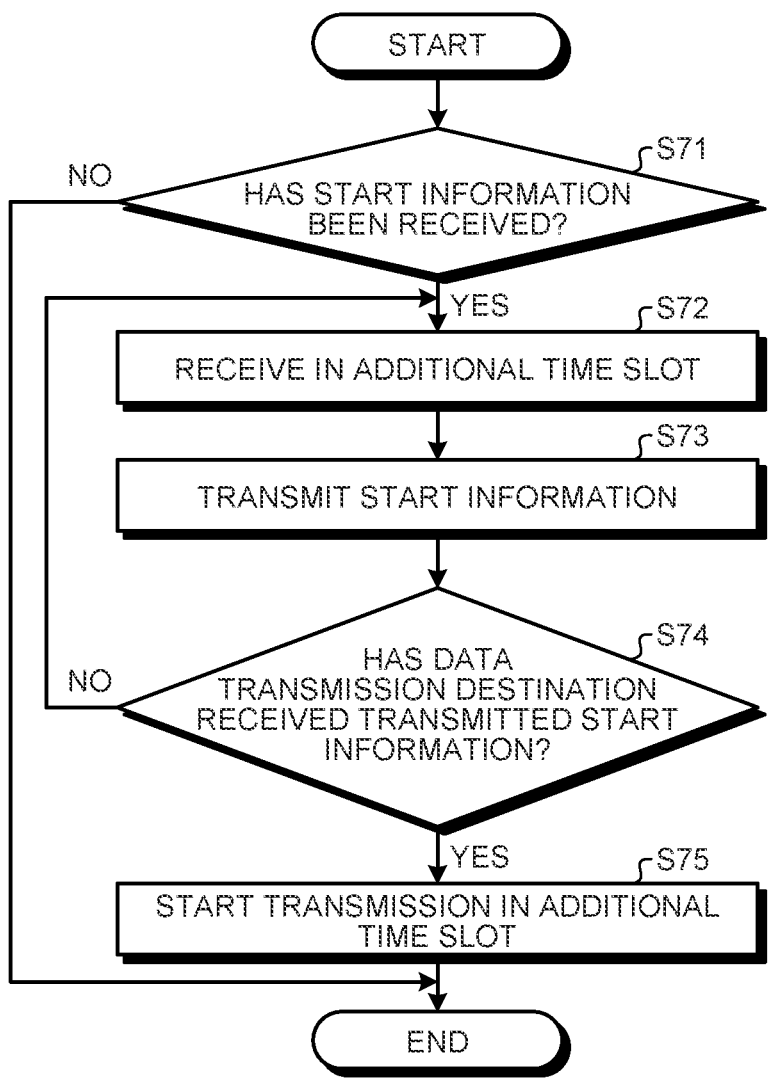
FIG. 19A is a flowchart illustrating an example 1 of an operation method of a parent node that has received start information of the burst mode in the fourth embodiment.

FIG. 19A is a flowchart illustrating an example 1 of an operation method of the parent node that has received the start information of the burst mode in the fourth embodiment. First, the communication processing unit 1 determines whether start information (first start information) of the burst mode has been received (step S71).

If the start information has not been received (No at step S71), the additional slot is not used in the data reception.

If the start information has been received (Yes at step S71), in order to receive the data in the slot for the wireless node that has transmitted the start information, the communication processing unit 1 performs the reception in the additional slot (step S72). Next, in order for the communication processing unit 1 itself to start the transmission by using the additional slot, the communication processing unit 1 transmits, to the transmission destination of the data (parent node), the data including start information (second start information) of the burst mode (step S73).

If the start information has been received (Yes at step S74), the communication processing unit 1 transmits the data using not only the basic slot but also the addition slot (step S75). If the start information has not been received (No at step S74), the process returns to step S72.

Note that the parent node that has received the start information may determine whether to start the burst mode.

Figure 19B:
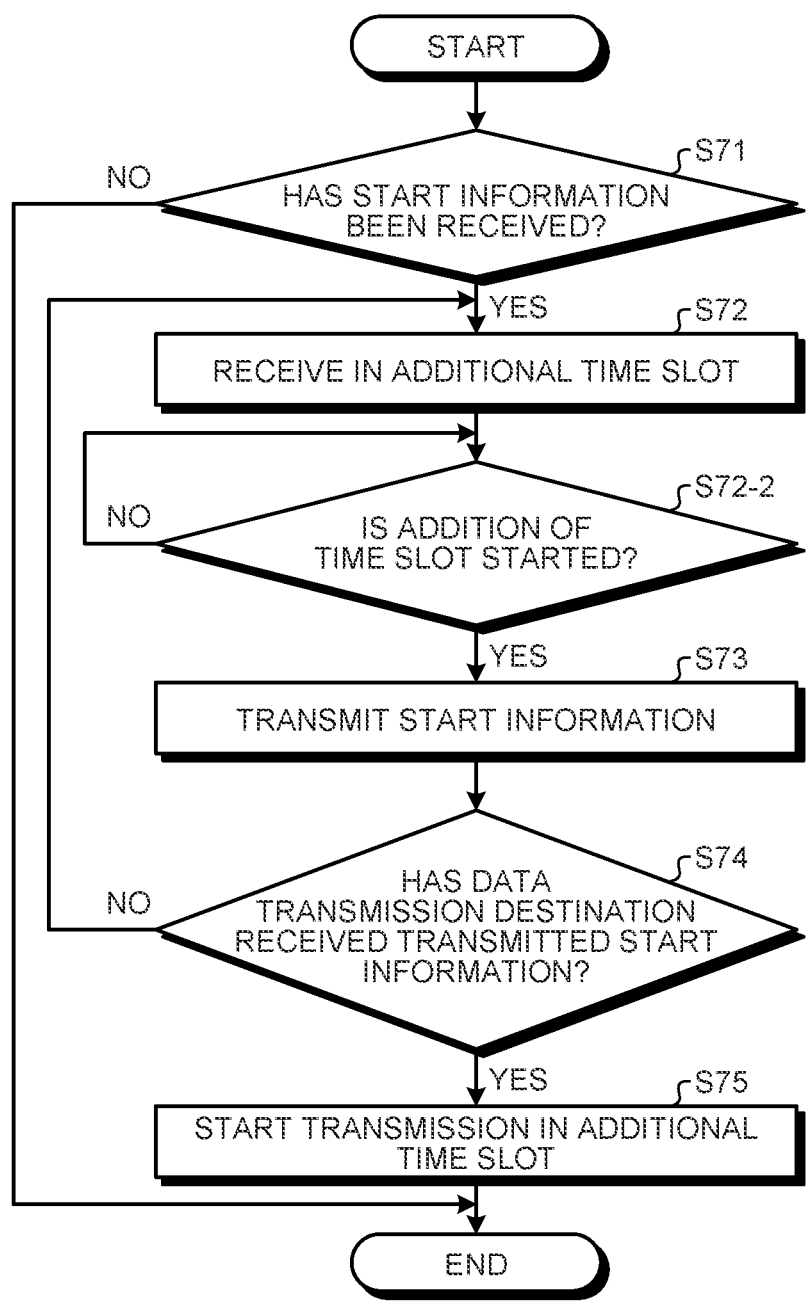
FIG. 19B is a flowchart illustrating an example 2 of the operation method of the parent node that has received the start information of the burst mode in the fourth embodiment.

FIG. 19B is a flowchart illustrating an example 2 of the operation method of the parent node that has received the start information of the burst mode in the fourth embodiment. In FIG. 19B, step S72-2 is added to the flowchart in FIG. 19A.

In FIG. 19B, if the start information has been received (Yes at step S71), in order to receive the data in the slot for the wireless node that has transmitted the start information, the communication processing unit 1 performs the reception in the additional slot (step S72), and then, the control unit 3 in FIG. 16 determines whether to start the addition of the slot (start the burst mode) (step S72-2). The determination process at step S72-2 is similar to that at step S51 described above (see FIG. 17). After the determination, if the burst mode is started (Yes at step S72-2), in order for the communication processing unit 1 itself to start the transmission by using the additional slot, the communication processing unit 1 transmits, to the transmission destination of the data (parent node), the data including the start information (second start information) of the burst mode (step S73). If the burst mode is not started (No at step S72-2), the data reception using the additional slot is continued, but the data including the start information (second start information) of the burst mode is not transmitted.

Figure 20A:
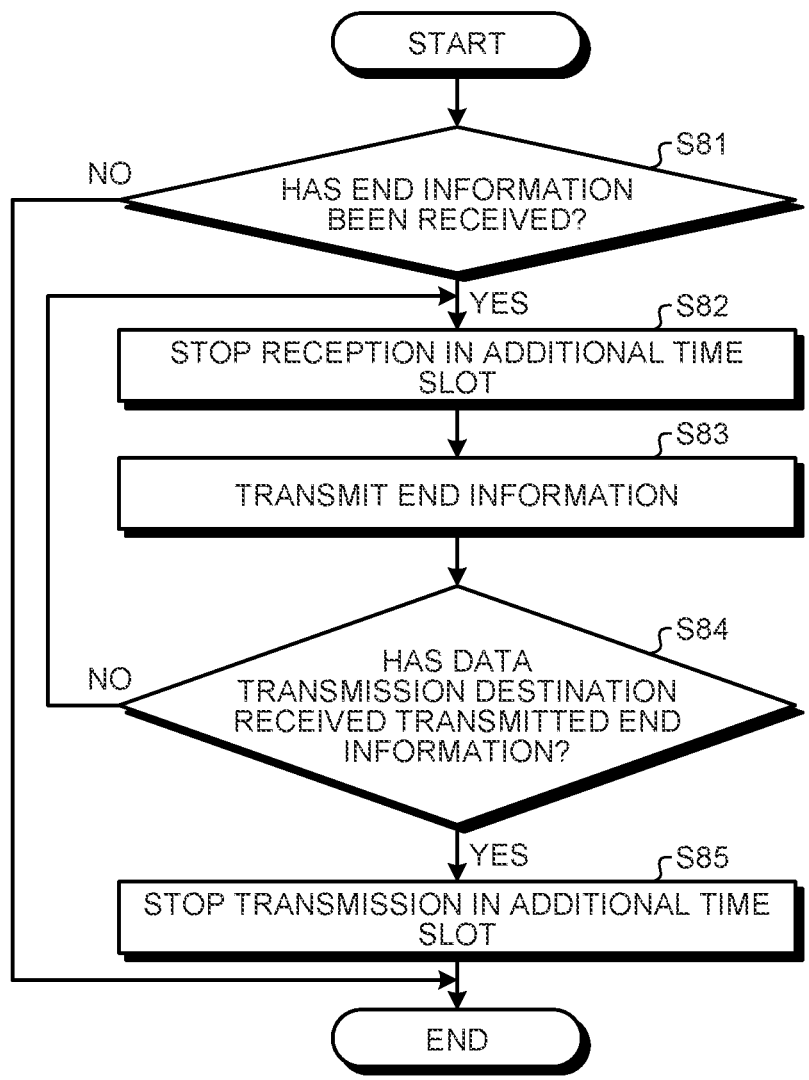
FIG. 20A is a flowchart illustrating an example 1 of an operation method of the parent node that has received end information of the burst mode in the fourth embodiment.

FIG. 20A is a flowchart illustrating an example 1 of an operation method of the parent node that has received the end information of the burst mode in the fourth embodiment. First, the communication processing unit 1 determines whether end information (first end information) of the burst mode has been received (step S81).

If the end information has not been received (No at step S81), the data reception using the additional slot is continued.

If the end information has been received (Yes at step S81), the communication processing unit 1 stops the reception using the additional slot (step S82). Next, in order for the communication processing unit 1 itself to end the transmission using the additional slot, the communication processing unit 1 transmits, to the transmission destination of the data (parent node), the data including end information (second end information) of the burst mode (step S83).

If the end information has been received (Yes at step S84), the communication processing unit 1 stops the data transmission using the addition slot (step S85). If the end information has not been received (No at step S84), the process returns to step S82.

Note that the parent node that has received the end information may determine whether to end the burst mode.

Figure 20B:
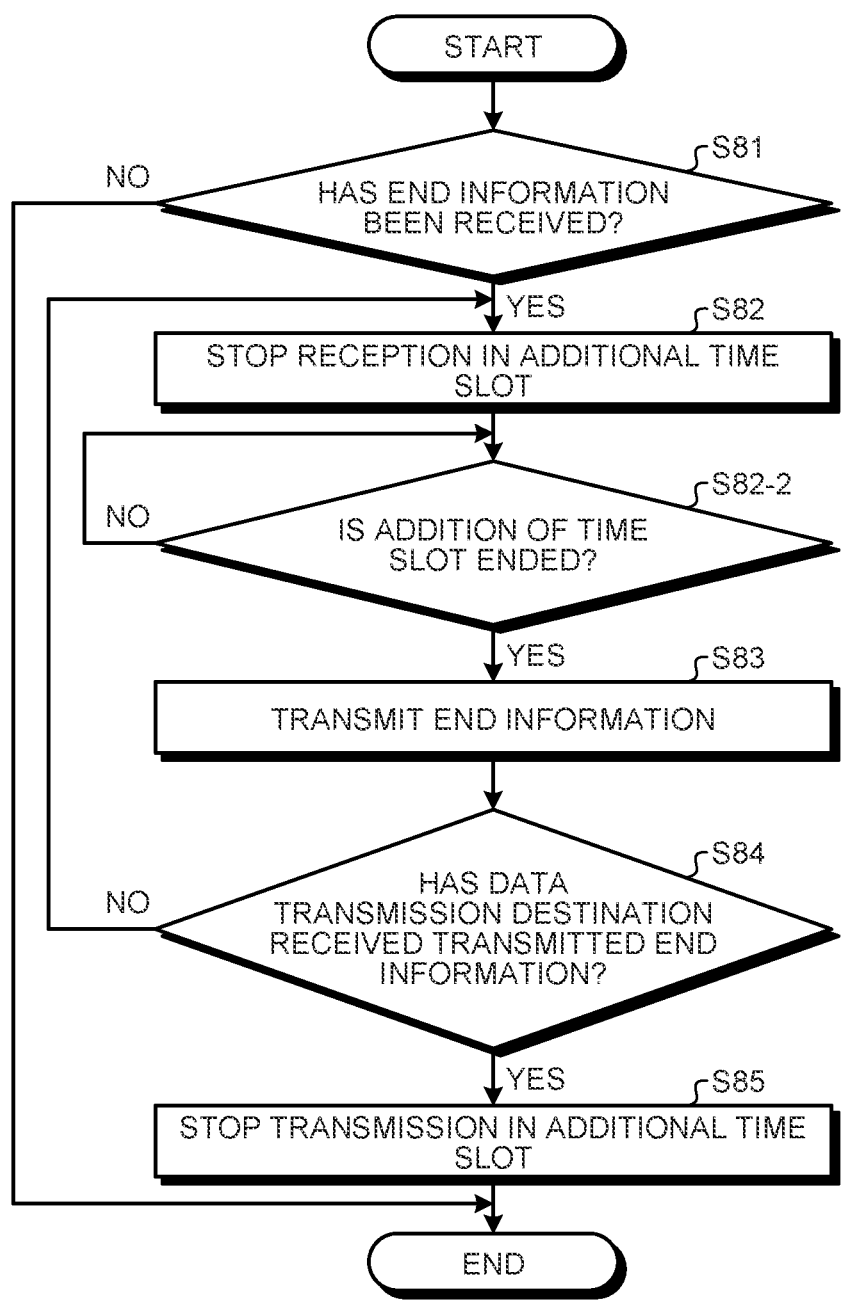
FIG. 20B is a flowchart illustrating an example 2 of the operation method of the parent node that has received the end information of the burst mode in the fourth embodiment.

FIG. 20B is a flowchart illustrating an example 2 of the operation method of the parent node that has received the end information of the burst mode in the fourth embodiment. In FIG. 20B, step S82-2 is added to the flowchart in FIG. 20A.

In FIG. 20B, if the end information has been received (Yes at step S81), the communication processing unit 1 stops the reception in the additional slot (step S82), and then, the control unit 3 in FIG. 16 determines whether to end the addition of the slot (end the burst mode) (step S82-2). The determination process at step S82-2 is similar to that at step S61 described above (see FIG. 18). After the determination, if the burst mode is ended (Yes at step S82-2), in order for the communication processing unit 1 itself to end the transmission by using the additional slot, the communication processing unit 1 transmits, to the transmission destination of the data (parent node), the data including the end information (second end information) of the burst mode (step S83). If the burst mode is not ended (No at step S82-2), the data reception using the additional slot is stopped, but the data including the end information (second end information) is not transmitted.

Figure 21:
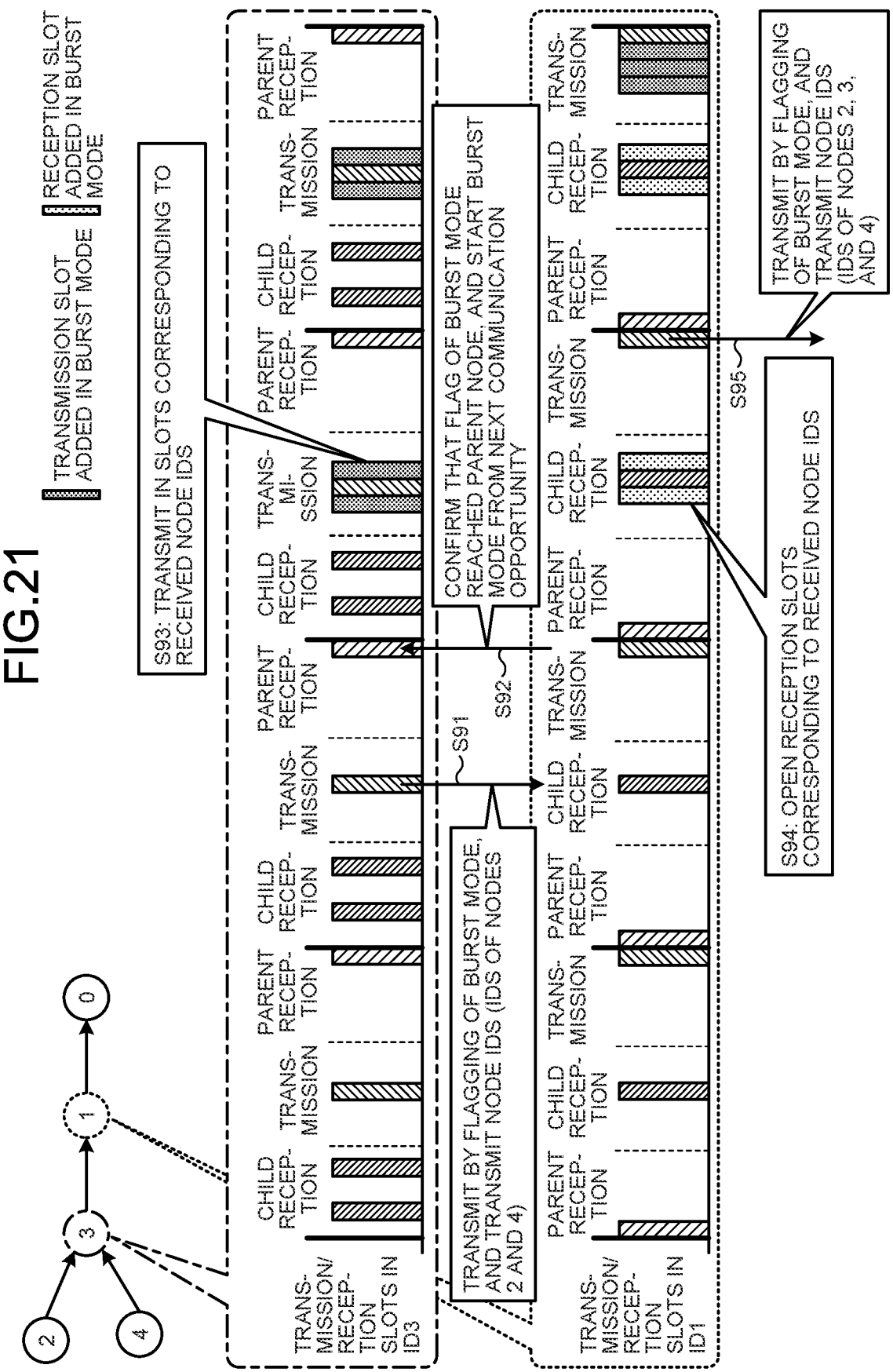
FIG. 21 is a diagram illustrating an example of a start operation of the burst mode in the fourth embodiment.

FIG. 21 is a diagram illustrating an example of a start operation of the burst mode in the fourth embodiment. First, the wireless node ID3 that starts the burst mode transmits the start information to the wireless node ID1 corresponding to the transmission destination (step S91). The start information includes the flag representing the start of the burst mode and the node IDs to be used for specifying the additional slots (in FIG. 21, ID2 and ID4).

Next, the wireless node ID1 transmits the fact that the start information of the burst mode has been received (step S92).

Subsequently, the wireless node ID3 starts the transmission in the additional slots including the slots for the wireless nodes that connect to the wireless node ID3 itself (step S93), and ID1 receives the data also in the additional slots (step S94).

Then, the wireless node ID1 itself also transmits the start information of the burst mode to the parent node (step S95). At this time, the information of ID2 and ID4 corresponding to the information of the slots used in the additional transmission in the wireless node ID3, in addition to the wireless node ID3 that connects to the wireless node ID1 itself, is added, and the transmission is performed. Then, from the next transmission opportunity, ID1 transmits the data with more transmission slots.

Figure 22:
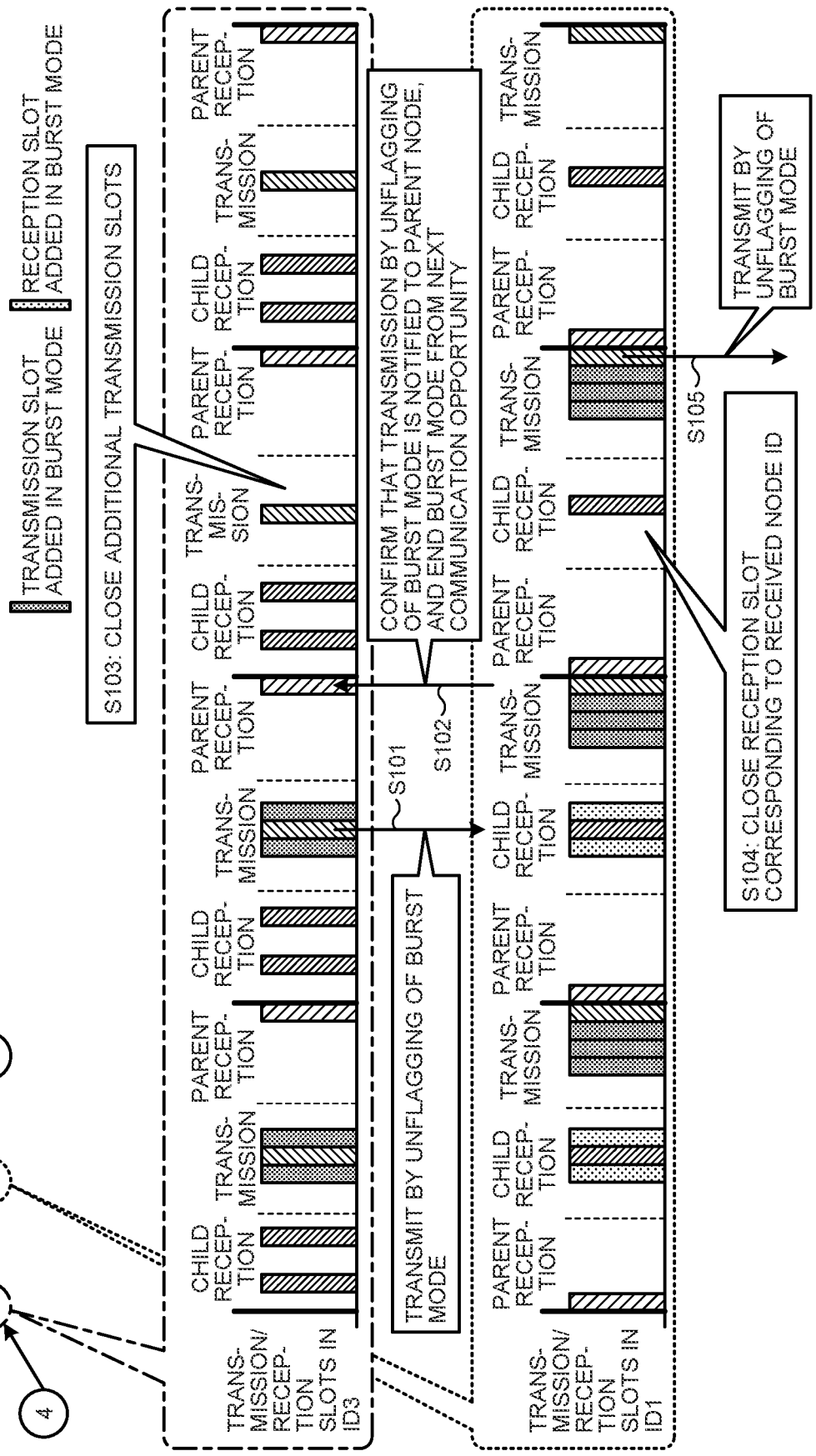
FIG. 22 is a diagram illustrating an example of an end operation of the burst mode in the fourth embodiment.

FIG. 22 is a diagram illustrating an example of an end operation of the burst mode in the fourth embodiment. First, the wireless node ID3 transmits the end information of the burst mode (step S101). Next, the wireless node ID1 that has received the end information transmits, to the wireless node ID3, the fact that the end information has been received (step S102). Subsequently, the wireless node ID3 stops the transmission in the additional transmission slots in the next transmission opportunity (step S103). Then, the wireless node ID1 stops the reception in the additional transmission slots for ID3 (step S104). After that, the wireless node ID1 itself also transmits the end information of the burst mode to the parent node (step S105).

Note that in FIG. 21 and FIG. 22, the start information and the end information of the burst mode are transmitted and received in the basic slot. However, a new slot that transmits and receives the start information and the end information of the burst mode (start/end information dedication slot) may be provided in the communication period. In this case, this start/end information dedication slot may be provided in a final frame in one super frame. Each slot in the final frame corresponds to the slot for each wireless node, and the wireless node that has an intention of the start or the end transmits the start information or the end information to the slot corresponding to the wireless node that is the transmission destination of the instruction. At this time, since the broadcast transmission may cause the interference, the start information or the end information may be transmitted and received by the unicast communication.

As described above, in the wireless communication device 10-2 according to the fourth embodiment, for example, the burst mode can be started when the transmission/reception quantity per unit time needs to be increased. In addition, for example, the burst mode can be ended when the electricity consumption quantity for the data transmission/reception needs to be suppressed. Therefore, in the fourth embodiment, for example, a large quantity of data can be transmitted per unit time while considering the transmission/reception data quantity and the electricity consumption quantity.

Fifth Embodiment

Next, a fifth embodiment is described. In the descriptions of the fifth embodiment, the descriptions similar to those of the first embodiment to the fourth embodiment are omitted, and the points different from those of the first embodiment to the fourth embodiment are described. In the fifth embodiment, a communication system further including a server device that receives the data aggregated by the aggregation device 20 is described.

Exemplary Device Structure

Figure 23:
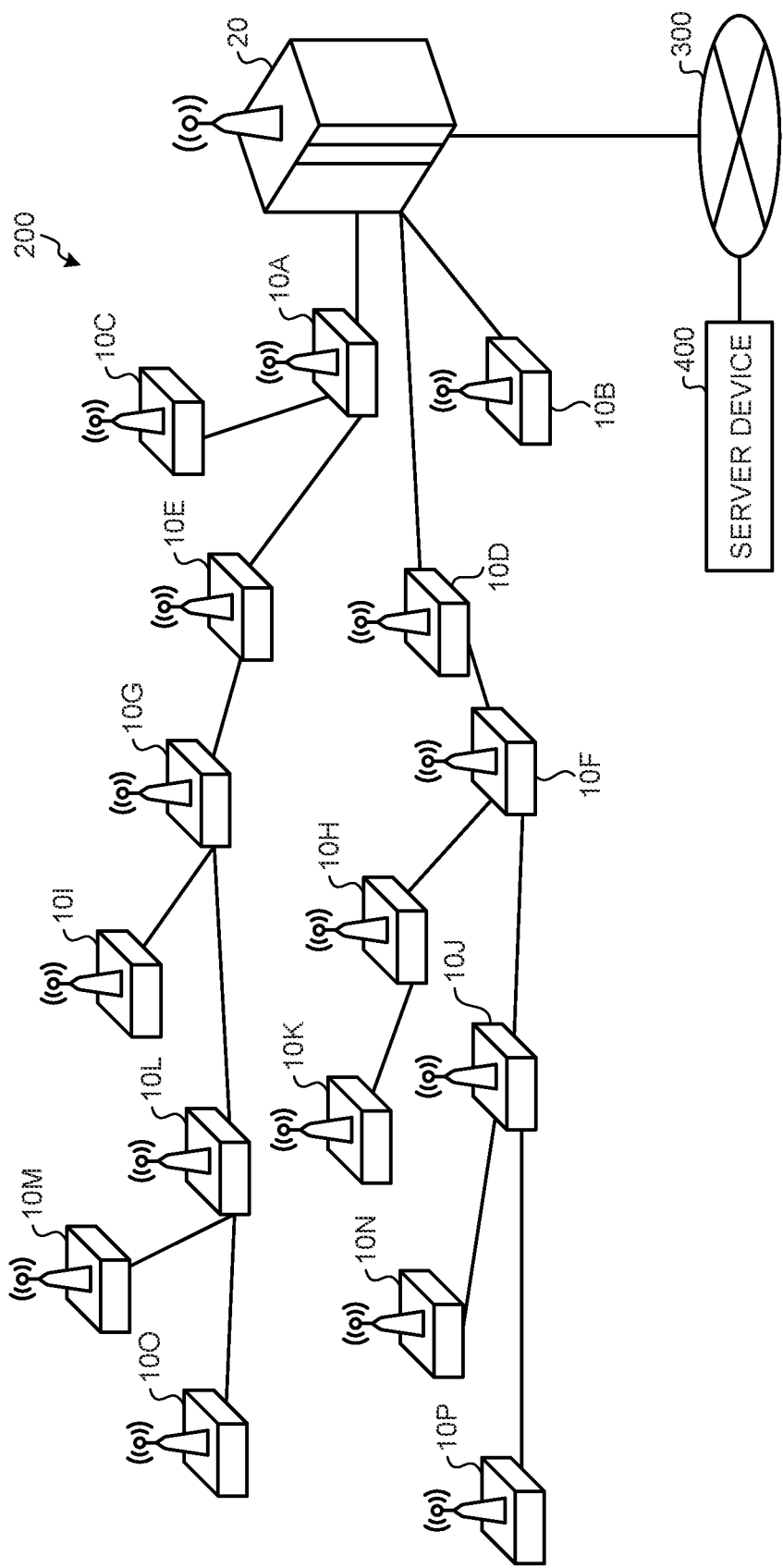
FIG. 23 is a diagram illustrating an exemplary device structure of a communication system according to a fifth embodiment.

FIG. 23 is a diagram illustrating an exemplary device structure of a communication system 200 in the fifth embodiment. The communication system 200 in the fifth embodiment includes the wireless communication devices 10A to 10P, the aggregation device 20, a network 300, and a server device 400.

The aggregation device 20 aggregates the data transmitted from each wireless communication device 10, and transmits the aggregated data to the server device 400 through the network 300.

The network 300 may use either wired communication or wireless communication. Moreover, in the network 300, the communication may be a combination of the wired and wireless communication.

If the server device 400 receives the data transmitted from the aggregation device 20, for example, the server device 400 stores the data and executes an application that performs a predetermined process for the data (for example, totalizing the data and determining a threshold for the data). For example, the server device 400 is a cloud server in the network 300.

Finally, examples of a hardware structure of the wireless communication device 10 (10-2) and the aggregation device 20 according to the first embodiment to the fifth embodiment are described.

Example 1 of Hardware Structure

Figure 24:
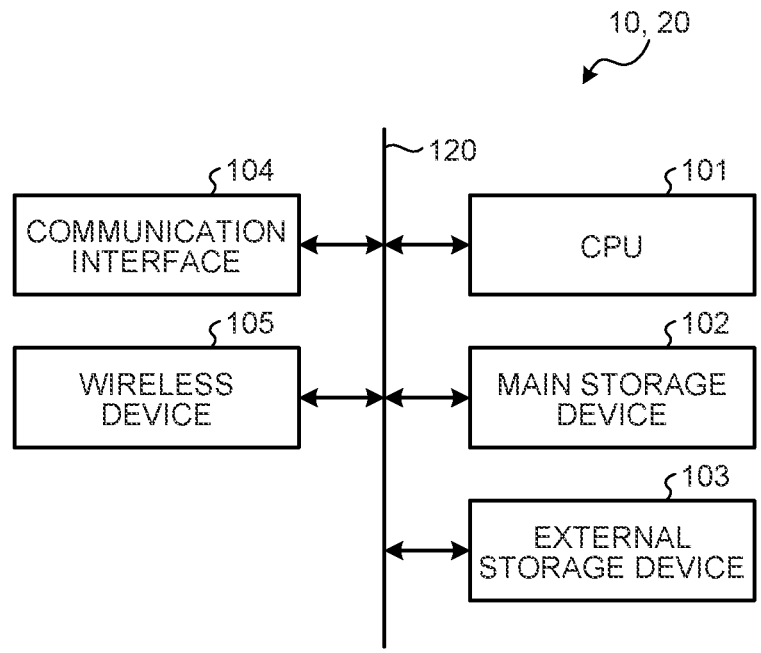
FIG. 24 is a diagram illustrating an example 1 of a hardware structure of the wireless communication device and an aggregation device according to the first embodiment to the fifth embodiment.

FIG. 24 is a diagram illustrating an example 1 of the hardware structure of the wireless communication device 10 (10-2) and the aggregation device 20 according to the first embodiment to the fifth embodiment. In the example 1 in FIG. 23, the wireless communication device 10 (10-2) and the aggregation device 20 include a central processing unit (CPU) 101, a main storage device 102, an external storage device 103, a communication interface 104, and a wireless device 105. The CPU 101, the main storage device 102, the external storage device 103, the communication interface 104, and the wireless device 105 are connected with each other by a bus 120.

The CPU 101 reads out computer programs from a storage medium, for example, the external storage device 103, and executes the computer programs in the main storage device 102.

The main storage device 102 stores the computer programs, data necessary to execute the computer programs, data generated by the execution of the computer programs, and the like. The main storage device 102 may be an arbitrary device. Examples of the main storage device 102 include a random access memory (RAM), a dynamic random access memory (DRAM), and a static random access memory (SRAM).

The main storage device 102 stores information including the computer programs, relay information, the frame information, the node ID, the number of hops, the parent node, the child node, and the like. The relay information is data that is received from another node, for example. Specifically, the relay information is sensor information acquired by another node, for example. For a certain node, a parent node is a node with one fewer hops than the certain node and corresponds to a transmission destination node for the certain node. For a certain node, a child node is a node with one more hops than the certain node and the certain node is a transmission destination node for the child node.

Moreover, the main storage device 102 may store an operating system (OS), a basic input output system (BIOS), various kinds of middleware, and the like.

The external storage device 103 stores the computer programs, the data necessary to execute the computer programs, the data generated by the execution of the computer programs, and the like. These computer programs and data are loaded into the main storage device 102 when the computer programs are executed. The external storage device 103 may be an arbitrary device. Examples of the external storage device 103 include a hard disk, an optical disk, a flash memory, and a magnetic tape. The external storage device 103 stores the information including the computer programs, the relay information, the frame information, the node ID, the number of hops, the parent node, the child node, and the like.

Note that the computer programs to be executed in the wireless communication device 10 (10-2) and the aggregation device 20 may be installed in the external storage device 103 in advance, for example. Alternatively, for example, the external storage device 103 may store computer programs that are transmitted to the aggregation device 20 from another device through a different wired or wireless network and the computer programs may be installed in the external storage device 103.

The communication interface 104 is a general-purpose I/F to communication with an external device. Examples of the communication interface 104 include UART, I2C, SPI, CAN, RS232, and Ethernet (registered trademark) port.

The wireless device 105 is a device used when the wireless communication device 10 and the aggregation device 20 communicate with another device wirelessly. Alternatively, the wireless communication device 10 and the aggregation device 20 may include a plurality of the wireless devices 105. For example, if the wireless communication device 10 and the aggregation device 20 each include two wireless devices 105 of a first wireless device 105 and a second wireless device 105, the second wireless device 105 may transmit the data collected by the first wireless device 105. Note that the second wireless device 105 may be an arbitrary device that uses the radio frequency different from that of the first wireless device 105. The second wireless device 105 may use cellular communication and Wi-Fi, for example.

Next, an example 2 of the hardware structure of the wireless communication device 10 (10-2) and the aggregation device 20 according to the first embodiment to the fifth embodiment is described.

Example 2 of Hardware Structure

Figure 25:
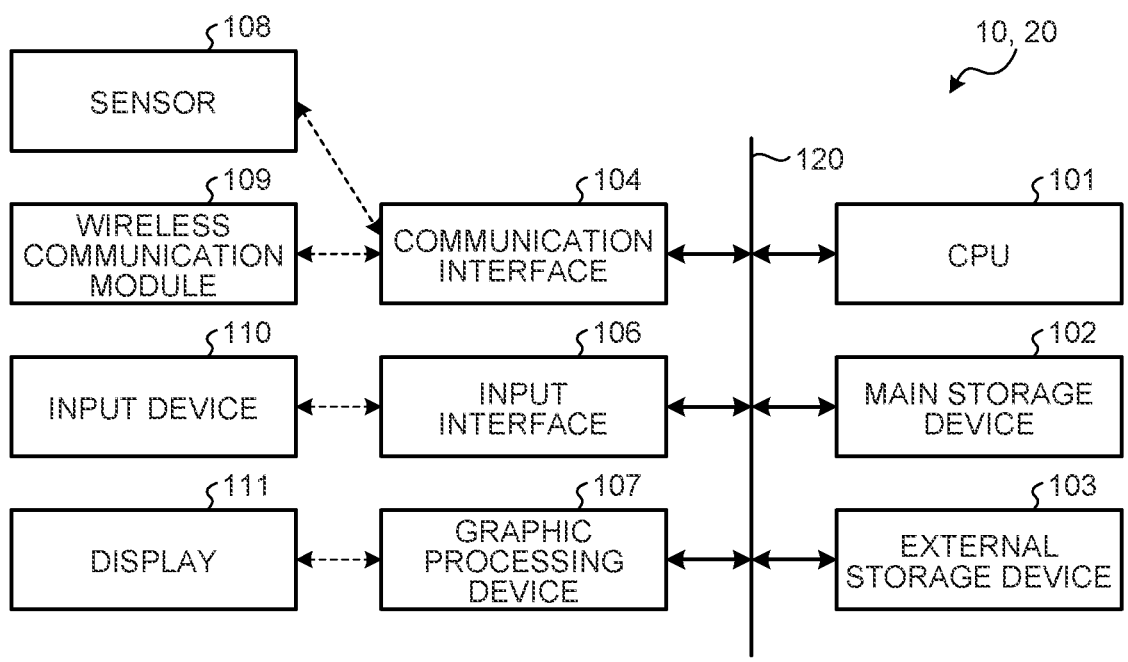
FIG. 25 is a diagram illustrating an example 2 of the hardware structure of the wireless communication device and the aggregation device according to the first embodiment to the fifth embodiment.

FIG. 25 is a diagram illustrating the example 2 of the hardware structure of the wireless communication device 10 (10-2) and the aggregation device 20 according to the first embodiment to the fifth embodiment. In the example 2 in FIG. 25, the wireless communication device 10 (10-2) and the aggregation device 20 include the CPU 101, the main storage device 102, the external storage device 103, the communication interface 104, an input interface 106, and a graphic processing device 107. The CPU 101, the main storage device 102, the external storage device 103, the communication interface 104, the input interface 106, and the graphic processing device 107 are connected with each other by the bus 120.

In the example 2 in FIG. 25, a sensor 108 and a wireless communication module 109 are connected to the communication interface 104. An input device 110 is connected to the input interface 106. Moreover, a display 111 is connected to the graphic processing device 107.

The descriptions of the CPU 101, the main storage device 102, the external storage device 103, and the communication interface 104 are the same as those in FIG. 24 and therefore not repeated.

The input interface 106 receives, from the input device 110, an operation signal corresponding to an input operation received by the input device 110. The input device 110 may be an arbitrary device. Examples of the input device 110 include a keyboard and a mouse.

The graphic processing device 107 is a device that causes the display 111 to display a video or an image on the basis of a video signal and an image signal generated by the CPU 101, for example. The display 111 may be an arbitrary device. Examples of the display 111 include a liquid crystal display (LCD), a cathode-ray tube (CRT), and a plasma display (PDP).

The sensor 108 may be an arbitrary device. Examples of the sensor 108 include an illuminance sensor, a temperature and humidity sensor, an acceleration sensor, and an angular velocity sensor. Moreover, the sensor 108 may be a pseudo sensor. For example, the pseudo sensor is another computer device that outputs the data. Note that since the aggregation device 20 is the device that aggregates the data from the wireless communication devices 10 (10-2), the aggregation device 20 may exclude the sensor 108.

The wireless communication module 109 plays a role of the aforementioned wireless device 105 in FIG. 24. It is not always necessary that the wireless communication module 109 has the same hardware structure as that of the above wireless device 105. Moreover, similarly to the wireless device 105 in FIG. 24, the wireless communication device 10 and the aggregation device 20 may include a plurality of the wireless communication modules 109.

Note that a power source of the hardware in FIG. 24 and FIG. 25 may be an arbitrary device. Examples of the power source of the hardware in FIG. 24 and FIG. 25 include a battery, a power generator, a power generation module, and a commercial power source.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication device included in a multi-hop network in which data is relayed in multiple stages in time division communication, the wireless communication device comprising:
one or more hardware processors configured to function as:
a decision unit that decides an additional slot, based on identification information received from a child node that transmits data to the wireless communication device;
a communication processing unit that transmits and receives data using the additional slot and a basic slot assigned based on frame information in the time division communication; and
a control unit that controls a start and an end of a burst mode that uses both the basic slot and the additional slot by determining a predetermined parameter by using a threshold, wherein
the wireless communication device includes a normal mode that uses the basic slot and the burst mode, and
when the burst mode is started, the communication processing unit transmits start information of the burst mode to a parent node of the wireless communication device, and when reception of the start information by the parent node is confirmed, the communication processing unit transmits and receives data using both the basic slot and the additional slot.

2. The wireless communication device according to claim 1, wherein
the identification information is an ID for identify each of one or more wireless communication devices included in the multi-hop network,
the frame information includes information representing a slot group including one or more slots, each assigned for each ID, and
the decision unit decides a slot assigned to an ID received from the child node as the additional slot.

3. The wireless communication device according to claim 1, wherein the communication processing unit decides a use frequency to be used in data communication, based on a number of hops of the wireless communication device and the frame information.

4. The wireless communication device according to claim 3, wherein the communication processing unit transmits and receives the data using a predetermined fundamental frequency in the basic slot, and transmits and receives the data using the use frequency in the additional slot.

5. The wireless communication device according to claim 4, wherein the fundamental frequency is a predetermined frequency that is set in the wireless communication device, or a frequency notified from a child node or a parent node that is a transmission destination of data of the wireless communication device.

6. The wireless communication device according to claim 1, wherein the predetermined parameter includes at least one of a quantity of reception data that is received from a child node or a parent node of the wireless communication device, a quantity of transmission data that is transmitted to a child node or the parent node of the wireless communication device, a quantity of non-transmitted data in the wireless communication device, an electricity consumption quantity of the wireless communication device, and a battery remaining quantity of the wireless communication device.

7. The wireless communication device according to claim 1, wherein when the burst mode is ended, the communication processing unit transmits end information of the burst mode to a parent node of the wireless communication device, and when reception of the end information by the parent node is confirmed, the communication processing unit stops using the additional slot.

8. The wireless communication device according to claim 1, wherein when the communication processing unit receives first start information representing a start of the burst mode of a child node of the wireless communication device from the child node, the communication processing unit starts a reception process in the additional slot to be used in the burst mode of the child node, and then transmits second start information representing a start of the burst mode of the wireless communication device to a parent node of the wireless communication device.

9. The wireless communication device according to claim 1, wherein when the communication processing unit receives first end information representing an end of the burst mode of a child node of the wireless communication device from the child node, the communication processing unit ends a reception process in the additional slot to be used in the burst mode of the child node of the wireless communication device, and then transmits second end information representing an end of the burst mode of the wireless communication device to a parent node of the wireless communication device.

10. A communication system comprising:
one or more wireless communication devices that constitute a multi-hop network in which data is relayed in multiple stages in time division communication;

an aggregation device that aggregates the data transmitted from the one or more wireless communication devices; and a server device that receives aggregated data from the aggregation device, wherein each of the one or more wireless communication devices comprises one or more hardware processors configured to function as:

a decision unit that decides an additional slot, based on identification information received from a child node that transmits data to the wireless communication device, a communication processing unit that transmits and receives data using the additional slot and a basic slot assigned based on frame information in the time division communication, and a control unit that controls a start and an end of a burst mode that uses both the basic slot and the additional slot by determining a predetermined parameter by using a threshold, wherein each of the one or more wireless communication devices includes a normal mode that uses the basic slot and the burst mode, and when the burst mode is started, the communication processing unit transmits start information of the burst mode to a parent node of the wireless communication device, and when reception of the start information by the parent node is confirmed, the communication processing unit transmits and receives data using both the basic slot and the additional slot.

11. A computer program product having a non-transitory computer readable medium including programmed instructions, wherein the instructions, when executed by a computer, cause a wireless communication device included in a multi-hop network in which data is relayed in multiple stages in time division communication to function as:

a decision unit that decides an additional slot, based on identification information received from a child node that transmits data to the wireless communication device;

a communication processing unit that transmits and receives data using the additional slot and a basic slot assigned based on frame information in the time division communication; and a control unit that controls a start and an end of a burst mode that uses both the basic slot and the additional slot by determining a predetermined parameter by using a threshold, wherein the wireless communication device includes a normal mode that uses the basic slot and the burst mode, and when the burst mode is started, the communication processing unit transmits start information of the burst mode to a parent node of the wireless communication device, and when reception of the start information by the parent node is confirmed, the communication processing unit transmits and receives data using both the basic slot and the additional slot.

* * * * *

UNITED STATES PATENT AND TRADEMARK OFFICE
CERTIFICATE OF CORRECTION

| | |
|---|---|
| PATENT NO. | : 11,743,922 B2 |
| APPLICATION NO. | : 17/458043 |
| DATED | : August 29, 2023 |
| INVENTOR(S) | : Nagakubo et al. |

It is certified that error appears in the above-identified patent and that said Letters Patent is hereby corrected as shown below:

In the Claims

- Claim 2, Column 18, Line 1, "for identify each" should read as --for identifying each--.

Signed and Sealed this
Thirteenth Day of February, 2024

*Katherine Kelly Vidal*

Katherine Kelly Vidal
*Director of the United States Patent and Trademark Office*